(12) United States Patent
Gupta et al.

(10) Patent No.: US 11,513,914 B2
(45) Date of Patent: Nov. 29, 2022

(54) COMPUTING AN UNBROKEN SNAPSHOT SEQUENCE

(71) Applicant: Nutanix, Inc., San Jose, CA (US)

(72) Inventors: Abhishek Gupta, Bengaluru (IN); Brajesh Kumar Shrivastava, Bengaluru (IN)

(73) Assignee: Nutanix, Inc., San Jose, CA (US)

( * ) Notice: Subject to any disclaimer, the term of this patent is extended or adjusted under 35 U.S.C. 154(b) by 24 days.

(21) Appl. No.: 17/139,489

(22) Filed: Dec. 31, 2020

(65) Prior Publication Data

US 2021/0406132 A1  Dec. 30, 2021

(30) Foreign Application Priority Data

Jun. 30, 2020 (IN) .............................. 202041027777

(51) Int. Cl.
*G06F 12/00* (2006.01)
*G06F 11/14* (2006.01)

(52) U.S. Cl.
CPC ...... *G06F 11/1464* (2013.01); *G06F 11/1451* (2013.01); *G06F 11/1469* (2013.01); *G06F 11/1484* (2013.01); *G06F 2201/84* (2013.01)

(58) Field of Classification Search
CPC ............ G06F 11/1464; G06F 11/1451; G06F 11/1484; G06F 2201/84; G06F 11/1456; G06F 2201/815
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 10,210,048 | B2 | 2/2019 | Sancheti |
| 10,255,137 | B1 * | 4/2019 | Panidis ............... G06F 11/1469 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — John A Lane
(74) *Attorney, Agent, or Firm* — Vista IP Law Group, LLP

(57) ABSTRACT

Methods, systems and computer program products for high-availability computing. In a computing configuration comprising a primary node, a first backup node, and a second backup node, a particular data state is restored to the primary node from a backup snapshot at the second backup node. Firstly, a snapshot coverage gap is identified between a primary node snapshot at the primary node and the backup snapshot at the second backup node. Next, intervening snapshots at the first backup node that fills the snapshot coverage gap are identified and located. Having both the backup snapshot from the second backup node and the intervening snapshots from the first backup node, the particular data state at the primary node is restored by performing differencing operations between the primary node snapshot, the backup snapshot from the second backup node, and the intervening snapshots of the first backup node.

24 Claims, 16 Drawing Sheets

(56) References Cited

U.S. PATENT DOCUMENTS

| | | | | |
|---|---|---|---|---|
| 10,896,097 | B1* | 1/2021 | Purcell | G06F 11/1451 |
| 11,086,724 | B1* | 8/2021 | Tokuri | G06F 11/1451 |
| 2015/0012709 | A1* | 1/2015 | Lad | G06F 11/1469 |
| | | | | 711/126 |
| 2015/0161151 | A1 | 6/2015 | Koryakina et al. | |
| 2016/0239389 | A1* | 8/2016 | Mam | G06F 16/128 |
| 2019/0012357 | A1* | 1/2019 | Schreter | G06F 16/1824 |
| 2019/0114230 | A1* | 4/2019 | Ramachandran | G06F 11/1464 |
| 2019/0155699 | A1* | 5/2019 | Luo | G06F 11/1471 |
| 2019/0266057 | A1* | 8/2019 | Dalal | G06F 11/1451 |
| 2019/0317948 | A1* | 10/2019 | Marsden | G06F 11/2028 |
| 2019/0332490 | A1 | 10/2019 | Bajaj | |
| 2020/0019424 | A1 | 1/2020 | Wang et al. | |
| 2020/0038433 | A1* | 2/2020 | Fagon | A61K 33/20 |
| 2022/0058094 | A1* | 2/2022 | Gunturu | G06F 11/1469 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

Mapperkids Lee et al., "Restore VM from Google cloud snapshots", Stack OverFlow, ( Feb. 22, 2019).

Perry, Y., "Google Cloud Snapshot: Data Backup and Restoration", NetApp, (Jan. 9, 2020).

"Working with persistent disk snapshots", Google Cloud, (Last updated on Jun. 4, 2021).

Cohesity, "Cohesity Data Protection", White Paper, Cohesity, (Jun. 28, 2016), (date retrieved from google, publication date unknown).

"About Hyper-V virtual machine restore", Druva Documentation, (Jun. 1, 2021), (date retrieved from google, publication date unknown).

"Snapshots that you can restore" Druva Documentation, date found via Google as Nov. 22, 2021.

Malbrough, D., "The Power of Recovery from Long-Term Archive", Rubrik, (Feb. 13, 2018), (date retrieved from google, publication date unknown).

Citrix Staff, "Recovering VMs From Snapshots", Citrix Product Documentation, (Sep. 30, 2020).

Anukesh, "Cloud Disaster Recovery with Druva," Druva, dated Jan. 26, 2018.

"About Retention for Backup Policies," Druva Documentation, date found via Google as Sep. 8, 2020.

\* cited by examiner

COMPUTING AN UNBROKEN SNAPSHOT SEQUENCE

RELATED APPLICATIONS

The present application claims the benefit of priority to India Provisional Patent Application Ser. No. 202041027777 titled "CASCADED DIFF COMPUTATIONS TO OPTIMIZE DATA TRANSFER FOR REPLICATION" filed on Jun. 30, 2020, which is hereby incorporated by reference in its entirety.

TECHNICAL FIELD

This disclosure relates to high-availability computing, and more particularly to techniques for computing an unbroken snapshot sequence from multiple repositories.

BACKGROUND

Disaster recovery sites have been in use for the purpose of protecting against a disaster-type failure of a primary site. When the need arises to restore a data state to the remediated primary node (or to a replacement node in lieu of a remediated primary node), then data (e.g., snapshots, metadata, etc.) stored at the disaster recovery site can be retrieved and applied to the primary node (or to a replacement node in lieu of the primary node).

In recent times, the frequency for taking snapshots has greatly increased so as to facilitate very up-to-date recoveries (e.g., recovery up to the hour before a failure, recovery up to the minute before a failure, etc.). This has led to an explosion in the number of snapshots to be stored at the disaster recovery site, and this in turn has led to a multi-tiered storage architecture where relatively recently captured snapshots are stored at the disaster recovery site (e.g., for fast recovery after a failure) and where older snapshots are stored at a backup site (e.g., for archival purposes).

To explain how this works, consider the following configuration:

- Node A serves the primary site and only a very few of the very latest snapshots are stored there. The slightly older snapshots "age out" and are offloaded to the next downstream node in the multi-tiered storage architecture.
- Node B serves the disaster recovery site. A copy of the latest snapshots from the primary site are stored here. As they age, the older snapshots are offloaded to a long-term backup site.
- Node C serves as the long-term backup site where a large number of older snapshots are retained (e.g., for archival purposes).

As can be seen from the foregoing configuration, the very newest snapshots are offloaded (e.g., cascaded) from the primary site to the disaster recovery site, and medium-aged snapshots are offloaded (e.g., cascaded) from the disaster recovery site to the backup site.

Consider the following multi-tiered storage policies:
- Node A: Contains last 5 snapshots.
- Node B: Contains last 10 snapshots.
- Node C: Contains last 100 snapshots excluding the snapshots present on B.

Based on the above multi-tiered storage policies, and strictly as an example, the following snapshots will be present on various nodes at some point:

- Node A: S100, S99, S98, S97, S96, S95
- Node B: S100, S99, S98, S97, S96, S95, S94, S93, S92, S91
- Node C: S90, S89, S88, S87, S86, S85, S84, S83, S82, S81—S00

In this scenario, to restore data to node A (e.g., up to the data state of S99), say from older data that resides only on node C (e.g., say from S85), it is impossible to fully restore node A to the data state of S99 using only node C since node C does not contain an unbroken chain of snapshots from S85 through S99. Furthermore, it is impossible to fully restore node A to the data state of S99 using only node B since node B does not contain an unbroken chain of snapshots from S85 through S99.

Unfortunately there are no known techniques to solve this broken snapshot chain problem—instead, a full backup would need to be located and used to restore node A. This might take a long time, and/or might incur a large amount of network I/O (input/output or IO). Therefore, what is needed is a technique or techniques that address restoring an entity on a primary node (e.g., a virtual machine) in the context of a multi-tiered disaster recovery architecture.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for computing an unbroken snapshot sequence, which techniques advance the relevant technologies to address technological issues with legacy approaches. More specifically, the present disclosure describes techniques used in systems, methods, and in computer program products for maintaining an unbroken snapshot sequence for disaster recovery in a multi-tiered storage architecture. Certain embodiments are directed to technological solutions for identifying an unbroken sequence of snapshots that span across two or more nodes that are organized into a multi-tiered disaster recovery architecture.

The disclosed embodiments modify and improve over legacy approaches. In particular, the herein-disclosed techniques provide technical solutions that address the technical problems attendant to restoring a desired data state from snapshots distributed across nodes in a multi-tiered disaster recovery architecture. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication. For example, when performing computer operations that address the various technical problems underlying restoring a desired data state from snapshots distributed across nodes in a multi-tiered disaster recovery architecture, it happens that both memory usage and CPU cycles demanded are significantly reduced as compared to the memory usage and CPU cycles that would be needed but for practice of the herein-disclosed techniques. This is because the amount of memory needed, the amount of networking bandwidth, and the amount of CPU cycles can be optimized by identifying the locations of snapshots that, when combined, form an unbroken sequence of snapshots. Then, determining based on the location and contents of the snapshots, which node(s) should perform difference calculations so as to reduce the amount of data sent over the network that connects the nodes.

Many of the herein-disclosed embodiments for identifying an unbroken sequence of snapshots that span across two or more nodes that are organized into a multi-tiered disaster recovery architecture are technological solutions pertaining to technological problems that arise in the hardware and software arts that underlie high-availability computing clusters. Aspects of the present disclosure achieve performance and other improvements in peripheral technical fields including, but not limited to, hyperconverged computing platform management and distributed storage systems.

Some embodiments include a sequence of instructions that are stored on a non-transitory computer readable medium. Such a sequence of instructions, when stored in memory and executed by one or more processors, causes the one or more processors to perform a set of acts for identifying an unbroken sequence of snapshots that span across two or more nodes that are organized into a multi-tiered disaster recovery architecture.

Some embodiments include the aforementioned sequence of instructions that are stored in a memory, which memory is interfaced to one or more processors such that the one or more processors can execute the sequence of instructions to cause the one or more processors to implement acts for identifying an unbroken sequence of snapshots that span across two or more nodes that are organized into a multi-tiered disaster recovery architecture.

In various embodiments, any combinations of any of the above can be organized to perform any variation of acts for maintaining an unbroken snapshot sequence for disaster recovery in a multi-tiered storage architecture, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
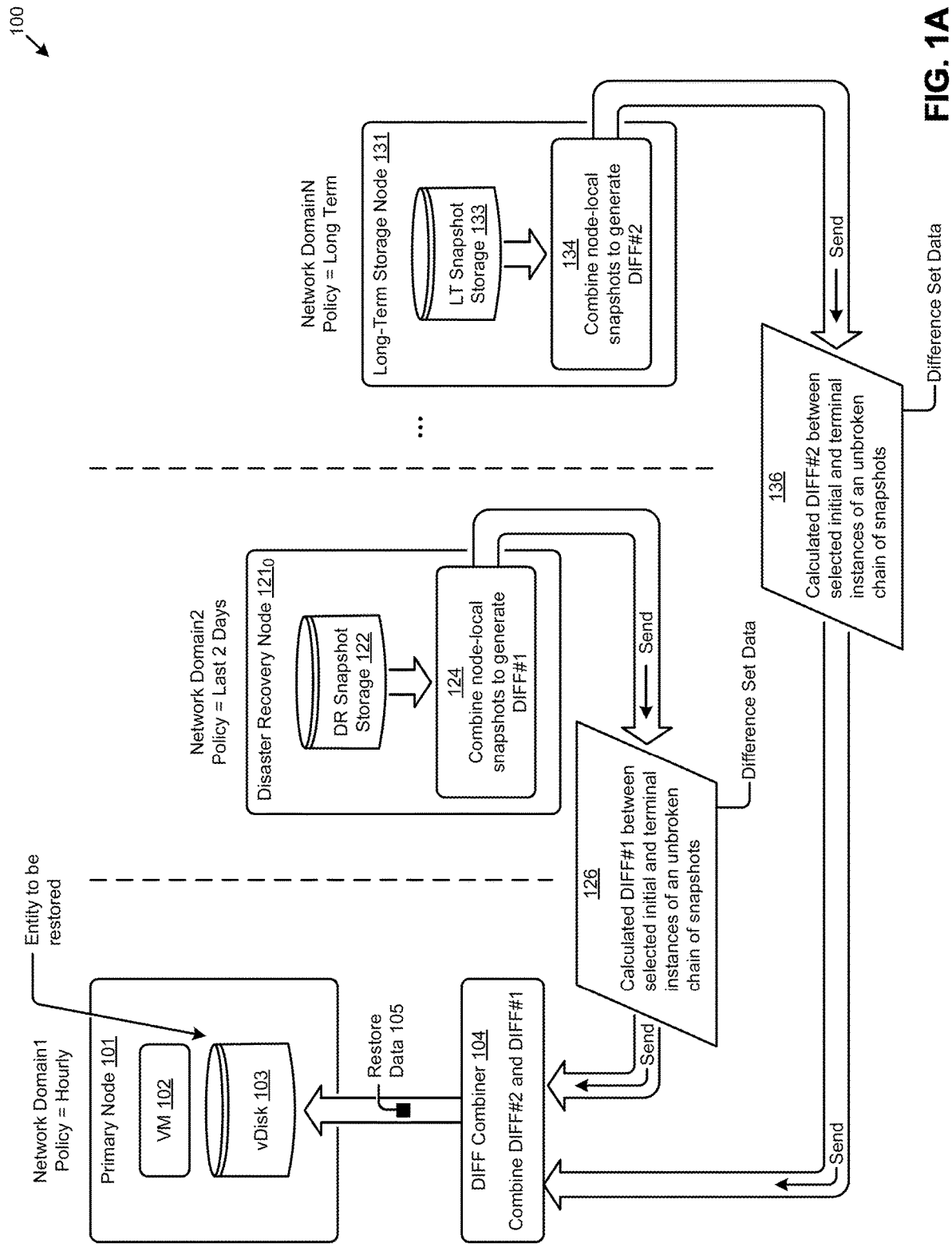
FIG. 1A exemplifies a multi-tiered storage architecture in which embodiments of the present disclosure can operate.

Aspects of the present disclosure solve problems associated with using computer systems for restoring a desired data state from snapshots distributed across nodes in a multi-tiered disaster recovery architecture. These problems are unique to, and may have been created by, various computer-implemented methods for restoring a desired data state from snapshots distributed across nodes in a multi-tiered disaster recovery architecture in the context of high-availability computing clusters. Some embodiments are directed to approaches for optimizing performance of difference set calculations and performance of communications of calculated difference sets. The accompanying figures and discussions herein present example environments, systems, methods, and computer program products for maintaining an unbroken snapshot sequence for disaster recovery in a multi-tiered storage architecture.

Overview

The techniques disclosed herein operate in a multi-tiered disaster recovery architecture. Policies are defined and enforced on various nodes that form a multi-tiered disaster recovery system. The policies are established so as to guarantee that, at all times, two or more unbroken sequences of snapshots can be combined to form a longer unbroken sequence.

Consider the following set of multi-tiered storage policies:

Node A: Store the last 5 closed snapshots, plus at least one currently open snapshot.

Node B: Store the last 10 closed snapshots—even when there is duplicate storage of the snapshots of Node A.

Node C: Store older 100 snapshots—but avoiding excessive duplicate storage of the ones present on Node B.

Based on the above multi-tiered storage policies, and strictly as an example, the following snapshots will be present on various nodes at some point:

Node A: S100, S99, S98, S97, S96, S95.

Node B: S100, S99, S98, S97, S96, S95, S94, S93, S92, S91.

Node C: S91, S90, S89, S88, S87, S86, S85, S84, S83, S82, S81—S00.

In this scenario, to restore data to an entity on node A (e.g., up to the data state of S99), say from older data that resides only on node C (e.g., from S85), it is impossible to fully restore node A to the data state of S99 using snapshots only from node C since node C does not contain an unbroken chain of snapshots from S85 through S99. Furthermore, it is impossible to fully restore node A to the data state of S99 using only node B since node B does not contain an unbroken chain of snapshots from S85 through S99.

One solution is to calculate the difference sets between a specific range of snapshots such that the combination of the difference set calculations results in the desired data state to the entity to be restored. In some cases, the calculations can be performed by different nodes in a cascaded fashion (e.g., to optimize the CPU cost of performing the difference calculation and to optimize the network bandwidth cost of performing needed data transfers). Referring to the foregoing example:

DIFF_Desired [S95, S85]=DIFF#1 [S95, S91]+DIFF#2 [S91, S85]

DIFF#1 [S95, S91] can be computed on node B and DIFF#2 [S91, S85] can be computed on node C. The entire DIFF transfer can be orchestrated by node B. Alternatively, node A can receive the required DIFF#1 (from node B) and also node A can receive DIFF#2 (from node C).

The foregoing is merely an illustrative example. In some cases, there can be many more nodes that are subject to the policies, which nodes can participate in disaster recovery.

Metadata can be stored in or with the foregoing snapshots. Such metadata may refer to snapshots and their ordinality, their size, their organization as well as other aspects of the snapshots to which the metadata refers. Metadata and corresponding snapshots combine in a manner such that it can be determined precisely what data has changed between consecutive snapshots and precisely where the changed data is stored. As such, a calculation over metadata and in combination with any additional data in the consecutive snapshots can determine exactly what data had changed between any two snapshots.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies a multi-tiered storage architecture 100 in which embodiments of the present disclosure can operate. As an option, one or more variations of multi-tiered storage architecture 100 or any aspect thereof may be implemented in the context of the architecture and functionality of the embodiments described herein and/or in any environment.

The figure is being presented to illustrate how multiple difference sets corresponding to multiple different grouping of snapshots can be calculated at a first set of nodes, and then combined at another node prior to the restoration event.

Specifically, FIG. 1A shows a multi-tiered disaster recovery configuration comprising a primary node 101, a disaster recovery node $121_0$, and a long-term storage node 131, each of which are situated into respective network zones (e.g., domain1, domain2, . . . , domainN). The primary node, the disaster recovery node, and the long-term storage node are associated with respective policies. In this example, the primary node is associated with a policy to perform and close snapshots hourly, the disaster recovery node is associated with a policy to retain a running set of the hourly snapshots such that all of the snapshots performed/closed by the primary node covering the past two days are stored (at least temporarily) at the disaster recovery node, and the long-term storage node is associated with a policy to retain older snapshots for archival purposes.

In accordance with such a policy regime, restoring a particular data state to a virtual machine (e.g., VM 102) of the primary node can be carried out by: (1) determining that neither the disaster recovery node nor the long-term storage node has an unbroken sequence of snapshots that can be used to reconstruct the particular data state; (2) analyzing a first set of snapshots that are stored on the disaster recovery node and analyzing a second set of snapshots that are stored on the long-term storage node to identify an unbroken sequence of snapshots that span across the disaster recovery node and the long-term storage node; (3) performing a first differencing operation over the first set of snapshots to determine a first difference; (4) performing a second differencing operation over the second set of snapshots to determine a second difference; and (5) combining the first difference with the second difference to form the particular data state.

Determination of a particular unbroken sequence of snapshots and/or calculation of the DIFFs can be done solely by one centralized node, or can be done cooperatively in a piecewise fashion at multiple nodes. In the shown example, a first difference set (i.e., DIFF#1) uses snapshots found in DR snapshot storage 122, which are in turn used by disaster recovery node difference calculator 124 to generate difference set data (e.g., DIFF#1, depicted as first DIFF data 126). Further, and as shown in this example, a second difference set (i.e., DIFF#2) uses snapshots found in LT snapshot storage 133, which are in turn used by long-term storage node difference calculator 134 to generate DIFF#2 (e.g., depicted as second DIFF data 136).

The DIFF data (e.g., first DIFF data 126 and second DIFF data 136) can be combined by any node. Referring again to the example shown, calculations of DIFF#1 and DIFF#2 corresponding to unbroken chains of snapshots are done piecewise at the disaster recovery node and at the long-term storage node, respectively. The calculated DIFFs are then combined (e.g., by an instance of DIFF combiner 104) by any node before being made available to the primary node. In the example shown, the DIFFs are sent upstream (e.g., upstream to a primary node), however in alternative embodiments, the DIFFs can be at least temporarily stored at the disaster recovery node and/or at the long-term storage node for retrieval by an upstream node (i.e., rather than being sent to a downstream node).

When calculating DIFFs, a range of snapshots is specified. A range of snapshots can refer to snapshot IDs, and can be codified using any known technique, for example, range [snapshot1, shapshot19] or range[S001, S019], etc. When calculating DIFFs in accordance with the present embodiments, two ranges are specified, and the two specified ranges overlap by at least one snapshot. As such, the two specified ranges span a sequence of snapshots such that there is no coverage gap. More specifically, two or more differencing operations can be carried out over two snapshot ranges that bridge any coverage gap between the primary node and the long-term storage node.

As used herein, a coverage gap is a single snapshot or range of snapshots that do not occur in the sequence between a primary node and a long-term storage node. Referring to the foregoing example, if at some moment in time the primary node was maintaining snapshot sequence S100, S99, S98, S97, S96, S95, and at the same moment in time, the long-term storage node was maintaining snapshot sequence S91, S90, S89, S88, S87, S86, S85, S84, S83, S82, S81 down to S00, then the coverage gap between the primary node and the long-term storage node at that moment in time is all of the sequentially intervening snapshots, namely S94, S93, and S92. A coverage gap can be filled by identifying at least all of the sequentially intervening snapshots between the primary node and the long-term storage node. In the foregoing example, the coverage gap can be filled by, for example, range[S95, S94, S93, S92], or range [S97, S96, S95, S94, S93, S92, S91], or range[S96, S95, S94, S93, S92, S91, S90], or any superset range that includes range[S94, S92].

The nodes can be organized in any topology spanning any number of domains. Alternatively, the nodes can be situated in the same domain. In some embodiments, and as shown, the nodes can be configured as (i) a primary node, (ii) a first backup node (e.g., disaster recovery node $121_0$), and (iii) a second backup node (e.g., long-term storage node 131). In this embodiment, when there exists a snapshot coverage gap between a primary node snapshot at the primary node and a backup snapshot at the second backup node, a coordinated set of differencing operations are performed by and between the primary node, the first backup node, and the second backup node to cause restoration of a particular data state to the primary node. In particular, in this configuration, restoring a data state to the primary node operates by (1) identifying a snapshot coverage gap between a primary node snapshot at the primary node and the backup snapshot at the second backup node; (2) identifying sufficient intervening snapshots at the first backup node that fills the snapshot coverage gap; and (3) restoring the particular data state by performing differencing operations between the primary node snapshot, the backup snapshot from the second backup node, and the intervening snapshots at the first backup node that fills the snapshot coverage gap. In this example, the particular data state to be restored is the data state of the vDisk 103 of VM 102. Moreover, a particular data state to be restored precisely corresponds to the state captured as restore data 105 that was calculated by operation of DIFF combiner 104.

The nodes need not be necessarily ordered as shown and/or any particular operation may be initiated and/or performed by a single node or by multiple nodes. Strictly as one example, a primary node may receive an instruction to restore a particular data state to itself from a backup snapshot at an arbitrarily situated backup node. Moreover any node can identify a snapshot coverage gap between a primary node snapshot at the primary node and the backup snapshot at the backup node, and any node can identify the location or locations of intervening snapshots at another backup node (e.g., a disaster recovery node). In some situations there may be multiple of these other backup nodes (e.g., a disaster recovery nodes) that have the snapshot or the snapshots that fill the snapshot coverage gap. Moreover, any of the acts pertaining to restoring the particular data state and/or any of the acts pertaining to performing differencing operations between the primary node snapshot, the backup snapshot at the backup node, and the intervening snapshot at another backup node can be performed at any node.

In the particular configuration of FIG. 1A, DIFF#2 is calculated at long-term storage node 131 as a result of performing a differencing operation over snapshots in LT snapshot storage 133. Also, in the particular configuration of FIG. 1A, DIFF#1 is calculated at disaster recovery node $121_0$ as a result of performing a differencing operation over snapshots in DR snapshot storage 122.

The differencing operations can be performed at any node within any variation of a multi-tiered storage architecture. Strictly as one example, an alternative multi-tiered storage architecture is shown and described hereunder.

Figure 1B:
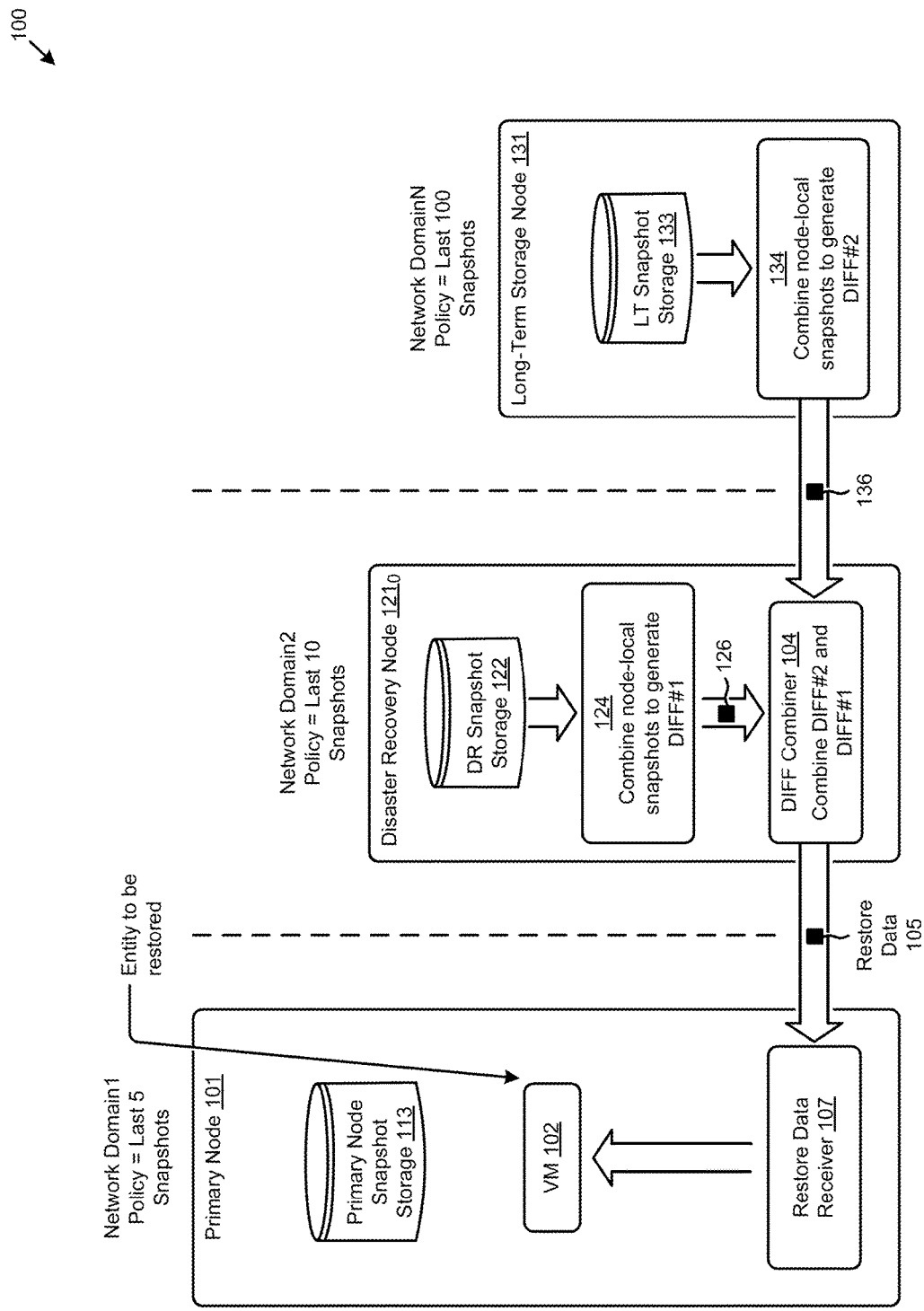
FIG. 1B exemplifies a first alternative variation of multi-tiered storage architecture in which snapshot range difference calculations are distributed across multiple nodes, according to an embodiment.

FIG. 1B exemplifies a first alternative variation of multi-tiered storage architecture 100 in which snapshot range difference calculations are distributed across multiple nodes. As an option, one or more variations of multi-tiered storage architecture 100 or any aspect thereof may be implemented in the context of the architecture and functionality of the embodiments described herein and/or in any environment.

In this example of FIG. 1B, the distribution (e.g., node location) of the operations to be performed are juxtaposed differently as compared to the example of FIG. 1A. Specifically, the shown DIFF combiner 104 is situated at disaster recovery node $121_0$. The DIFF combiner combines second DIFF data 136 with first DIFF data 126 so as to produce restore data 105, which is in turn sent to the primary node.

As shown, primary node 101 implements a restore data receiver 107 which processes restore data 105 for loading into data structures of VM 102.

The foregoing are merely illustrative examples for restoring a virtual disk of a virtual machine from two different nodes at two different tiers. However, the heretofore described techniques can be applied when there are many more nodes and/or many more tiers. Provisioning of nodes into a multi-tiered storage architecture may be done based on any one or more of a variety of factors. Strictly as examples, provisioning of nodes into a multi-tiered storage architecture may be done based on geographic location of the nodes, and/or network bandwidth available between the nodes, and/or CPU availability and/or load balancing between the nodes. Furthermore, and strictly as examples, determination of which nodes should be tasked with performing which DIFF calculations can be made based on the CPU capability of the nodes, network bandwidth available between the nodes, load balancing considerations, and/or any of a variety of storage-centric characteristics of the nodes, etc. One possible variation where multiple nodes having different node-specific characteristics and are provisioned into a multi-tiered storage architecture is shown and described as pertains to FIG. 1C.

Figure 1C:
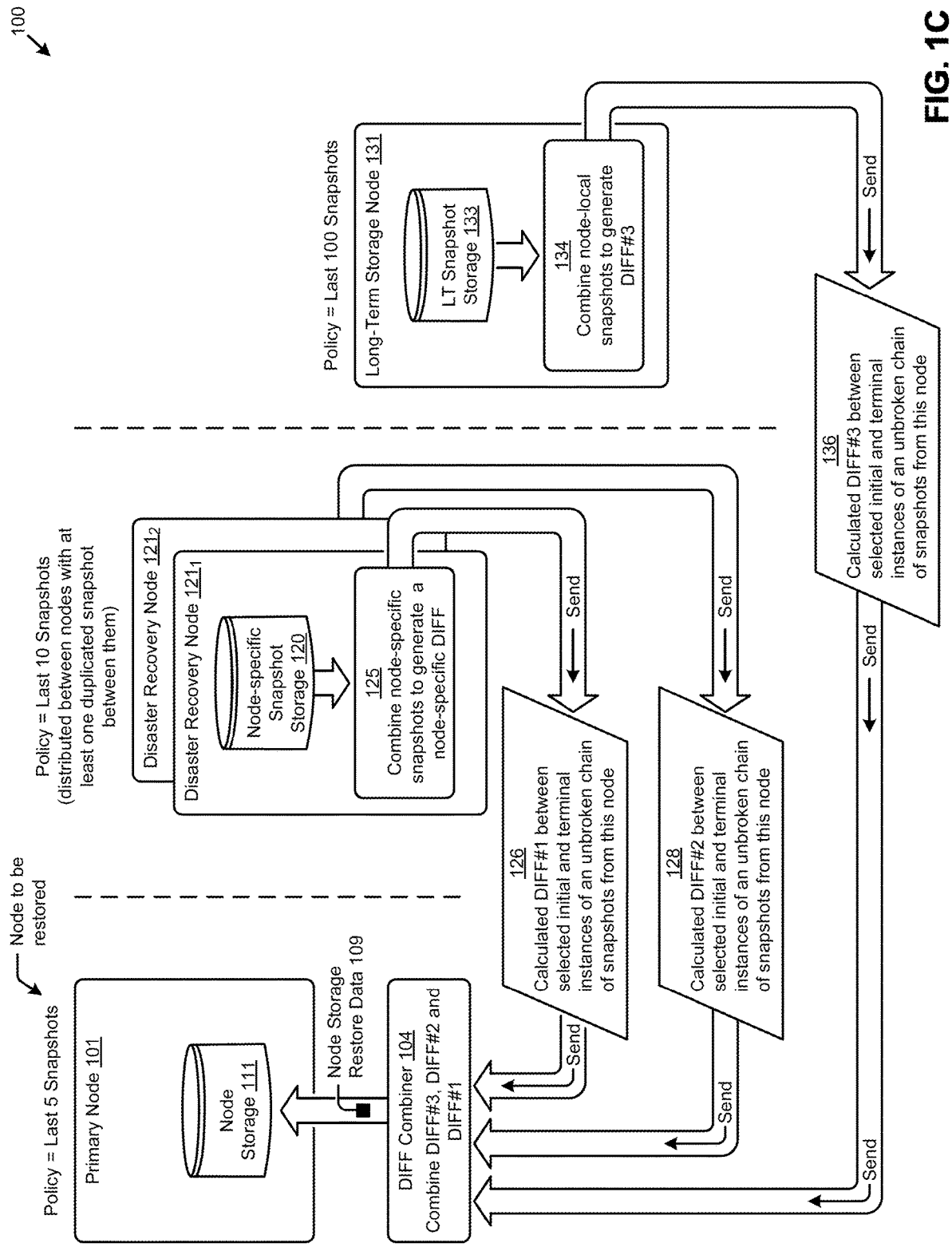
FIG. 1C exemplifies a second alternative variation of multi-tiered storage architecture in which snapshot range difference calculations are distributed across multiple nodes, according to an embodiment.

FIG. 1C exemplifies a second alternative variation of multi-tiered storage architecture 100 in which snapshot range difference calculations are distributed across multiple nodes. As an option, one or more variations of multi-tiered storage architecture 100 or any aspect thereof may be implemented in the context of the architecture and functionality of the embodiments described herein and/or in any environment.

The multi-tiered storage architecture example of FIG. 1C differs from the multi-tiered storage architecture example of FIG. 1B at least in that there are two independent disaster recovery nodes (e.g., disaster recovery node $121_1$ and disaster recovery node $121_2$). Each of the two independent disaster recovery nodes are configured to be able to access their respective node-specific snapshot storage 120 repositories. The range of snapshots covered by the two independent disaster recovery nodes can be distributed across the nodes in a load-balancing configuration. There is at least one snapshot within the range that is duplicated. That is, at least one snapshot is common between the two independent disaster recovery nodes. This facilitates performance of DIFF calculations independently by each individual one of the two independent disaster recovery nodes from their respective node-specific snapshots. Moreover, each of the two independent disaster recovery nodes are configured to be able to combine any range from their node-specific snapshots to generate a node-specific DIFFs (operation 125). The results of the DIFF operations (e.g., first DIFF data 126 and second DIFF data 128, as shown) are in turn combined to form node storage restore data 109, which is in turn used to restore a desired data state into node storage 111. In some cases, node storage restore data includes both a node configuration data state and node-local storage data state of a node to be restored.

Policy Variations

There may be variations among the various policies that apply to the various nodes. In the example of FIG. 1A, the policies are stated in terms of timeframes, whereas in other situations and/or in other examples, the policies are stated in terms of a number of snapshots that are maintained at a corresponding node (e.g., in primary node snapshot storage 113 in primary node 101 of FIG. 1B). Some policies may specify a number of snapshots that are to be duplicated between different nodes. This is so that DIFF calculations can be performed independently by each individual node from their respective node-specific snapshots in a manner that support subsequent combining of multiple DIFF calculations.

As can be seen from the forgoing discussions, there are many deployment variations that fall within the scope of multi-tiered storage architecture configurations as well as many different possibilities for where (e.g., at which nodes) snapshot differencing operations are carried out. Moreover, as can be seen from the forgoing discussions, there are many policy variations that apply to the nodes and/or tiers of any particular multi-tiered configuration.

Figure 2:
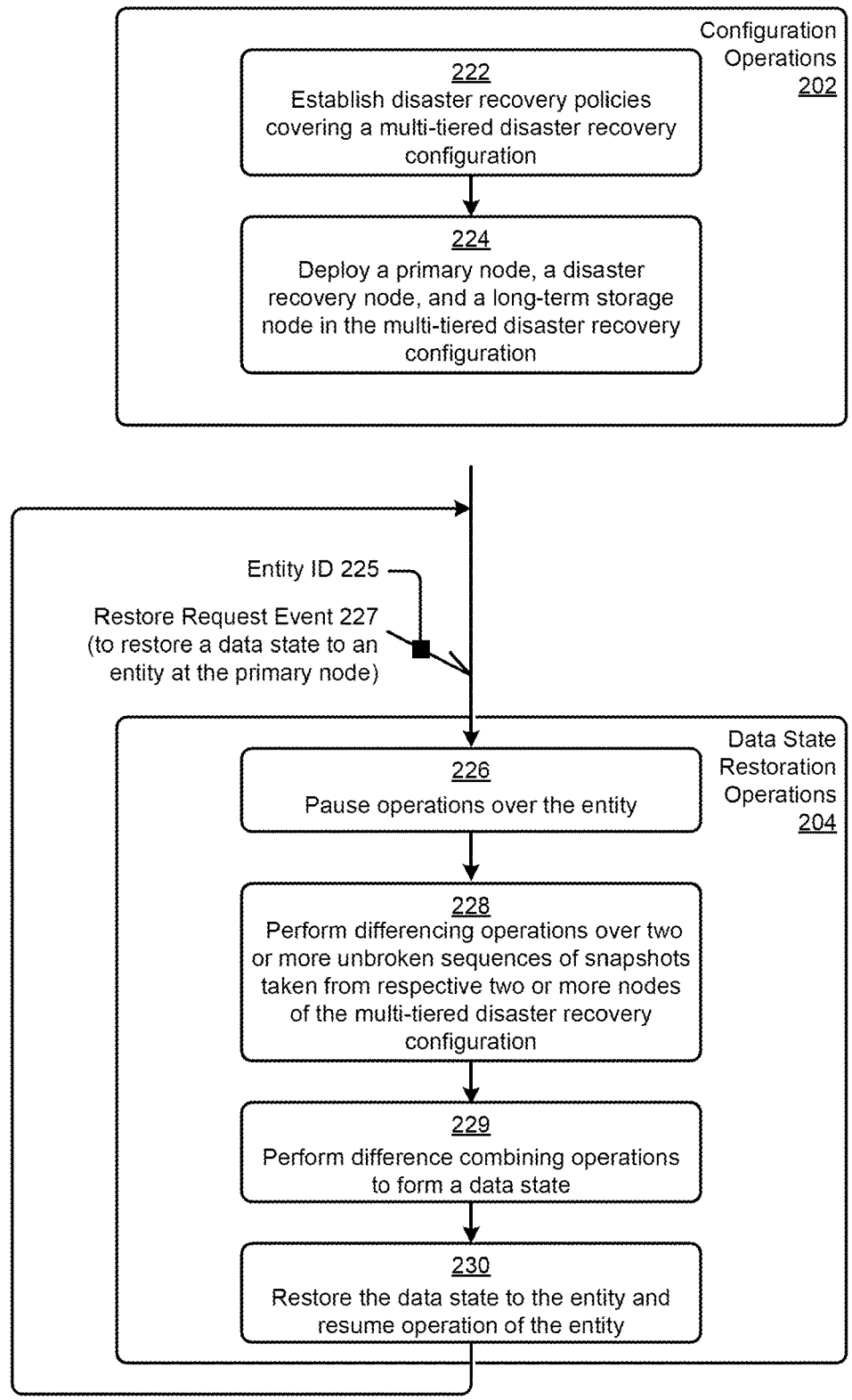
FIG. 2 is a flowchart of a system configured for maintaining an unbroken snapshot sequence for disaster recovery in a multi-tiered storage architecture, according to an embodiment.

FIG. 2 is a flowchart of a system 200 configured for maintaining an unbroken snapshot sequence for disaster recovery in a multi-tiered storage architecture. As an option, one or more variations of flowchart 200 or any aspect thereof may be implemented in the context of the architecture and functionality of the embodiments described herein and/or in any environment.

The figure is being presented to illustrate how (1) a multi-tiered storage architecture can be configured (e.g., via configuration operations 202), and how (2) the system can respond to a request to restore a data state to a particular entity (e.g., via data state restoration operations 204).

Specifically, and as shown, step 222 serves to initially establish policies that correspond to nodes and/or tiers of the multi-tiered disaster recovery configuration. The policies may influence the system-wide deployment and/or node-by-node configuration of nodes and/or configuration of the tiers of the multi-tiered disaster recovery configuration. In this and other embodiments, the deployment (step 224) includes a primary node, a disaster recovery node, and a long-term storage node. The policies can be changed at will and re-applied to the nodes and/or tiers of the multi-tiered disaster recovery configuration. In exemplary cases, the policies refer ranges or sequences of snapshots that are managed respectively by individual nodes of the multi-tiered disaster recovery configuration.

Once the nodes are configured, any one or more of the nodes can receive and respond to an instruction to restore a particular entity of the primary node. The entity can be a vDisk, or can be a virtual machine configuration, or can be a different virtual entity, or can be the node and/or its storage in its entirety. Such a request can be raised at any moment in time. As depicted, a restore request event 227 is a message that includes an entity ID 225 of an entity to be restored. At step 226, activities that may affect the data state of the entity to be restored are paused. Then, at step 228, differencing calculations over two or more unbroken sequences of snapshots taken from respective two or more nodes of the multi-tiered disaster recovery configuration are performed. Step 229 serves to combine the difference calculations of step 228. The aforementioned step 229 to combine the difference calculations of step 228 can be carried out over any two or more sets of DIFF data that derive from two or more unbroken sequences of snapshots. More specifically, one way to combine the difference calculations is to take a first amalgamated set of snapshot differences from an earlier-dated range of snapshots and apply a second amalgamated set of snapshot differences from a later-dated range of snapshots on top of the first amalgamated set. An example of snapshot difference combining operations is shown and described in FIG. 6A, FIG. 6B, and FIG. 6C.

At step 230, the data state of the entity is restored by applying the combined difference calculations of step 229 to a data state to be restored When the restoration operations over the entity to be restored are complete, then the paused operation can be resumed (step 230). The snapshot difference combining operations can be performed repeatedly, possibly asynchronously with respect to other operations of the system. In some cases, multiple restore request events are raised concurrently and are processed by separate instances of snapshot difference combining operations.

The foregoing discussions refer to policies that correspond to different storage areas (e.g., different storage areas of different nodes). The different policies may refer to a different particular logical sequence of snapshots that apply to the different nodes. Strictly as an example, a logical sequence of snapshots may refer to semantics corresponding to "the last 5 snapshots," and/or "the last 10 snapshots," or "the last 100 snapshots." Moreover, a logical sequence of snapshots may refer to (1) semantics corresponding to how snapshot sequences might overlap (e.g., to provide fast recovery time objectives), (2) semantics corresponding to how snapshot sequences might not overlap (e.g., to avoid wasteful duplication of stored data), and (3) semantics pertaining to how the snapshot sequences might be distributed as time progresses. Several such policies and their interaction with each other as between nodes are shown and described as pertains to the example snapshot distributions FIG. 3A and FIG. 3B.

Figure 3A:
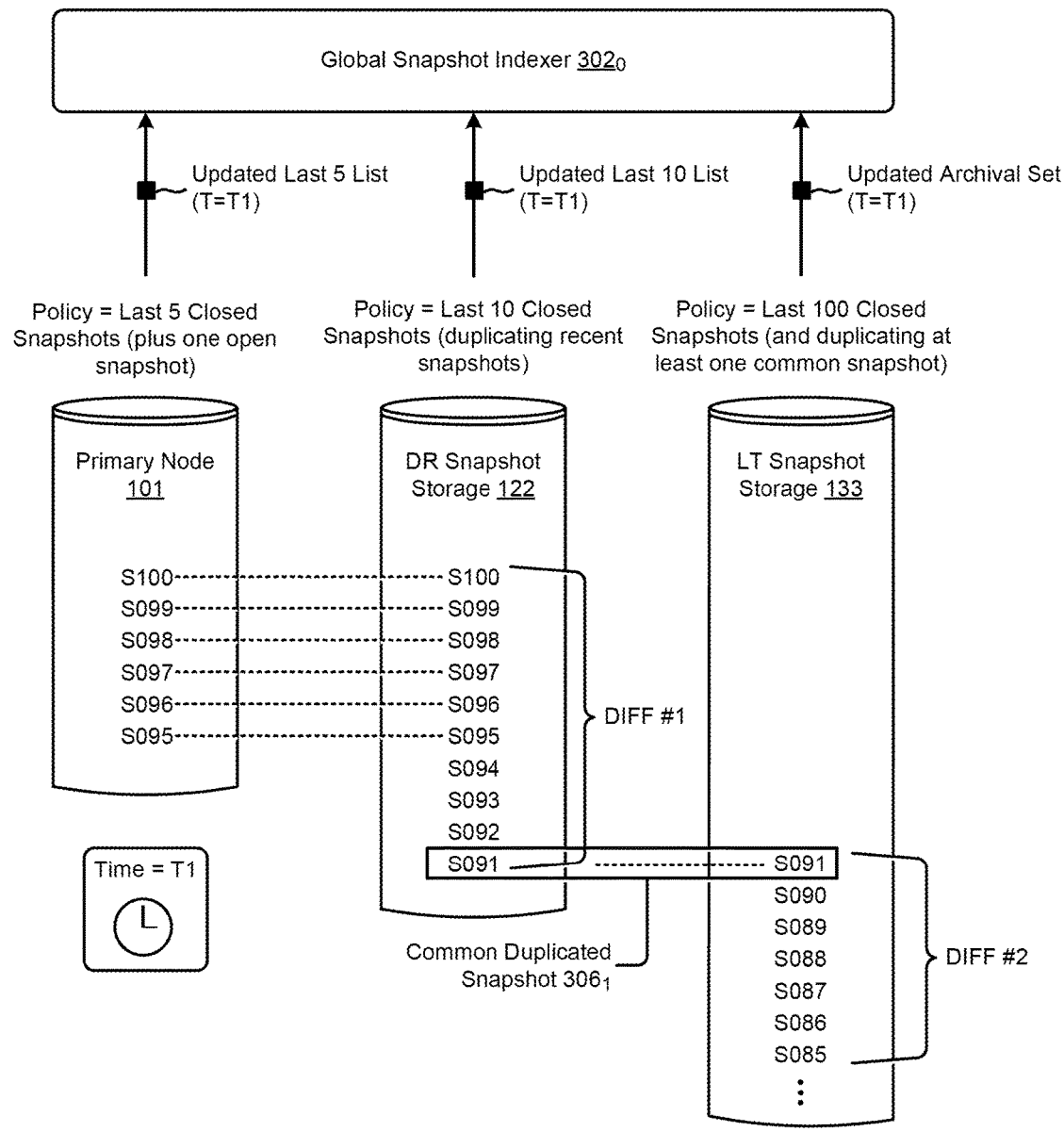
FIG. 3A illustrates a first example snapshot distribution across a multi-tiered storage architecture, according to an embodiment.

FIG. 3A illustrates a first example snapshot distribution 3A00 across a multi-tiered storage architecture. As an option, one or more variations of snapshot distribution 3A00 or any aspect thereof may be implemented in the context of the architecture and functionality of the embodiments described herein and/or in any environment.

The example of FIG. 3A pertains to the snapshot distribution at time=T1. Consider that, for illustrative purposes, the system has been in operation from some time since T0, where T0<T1. As such, many snapshots have been taken by the primary node, many snapshots have been copied into the disaster recovery node, and many snapshots have been retained at the long-term storage node. In this example, (1) snapshots S095 through S100 have been recently taken and retained by the primary node, (2) a copy of all the snapshots (i.e., S095 through S100) of the primary node are present in the disaster recovery node, and (3) many older snapshots (e.g., cascaded from the disaster recovery node) have been retained at the long-term storage node.

The policies that apply to the disaster recovery node and the long-term storage node are defined such that there is at least one snapshot at the long-term storage node that is a copy of the same (i.e., overlapping) snapshot at the disaster recovery node. This is because, during restoration, a process or processes will analyze the snapshots that are stored on the disaster recovery node as well as the snapshots that are stored on the long-term storage node to identify an unbroken sequence of snapshots that span across the disaster recovery node and the long-term storage node.

Referring to the example shown in FIG. 3A: (1) the policy applied to the primary node is to store the last 5 closed snapshots (e.g., snapshots S100 down to S095) plus one open snapshot under construction, (2) the policy applied to the disaster recovery node is to store the last 10 closed snapshots including duplicating the most recent 5 snapshots of the primary node (e.g., snapshots S100 down to S091), and (3) the policy applied to the long-term storage node is to store 100 older closed snapshots including an overlap such that there is at least one snapshot at the long-term storage node that is a copy of the same snapshot (i.e., overlapping common duplicated snapshot $306_1$) at the disaster recovery node (e.g., snapshot S091 down to S085 and earlier).

The figure also shows a global snapshot indexer $302_0$. In the shown embodiment, the various nodes of the multi-level architecture periodically report (e.g., to the global snapshot indexer) an indication (e.g., an updated set listing) of their then-current locally managed sequence of snapshots. More specifically, at T=T1, the primary nodes reports an updated last 5 list, the disaster recovery node reports an updated last 10 list, and the long-term storage node reports an updated archival set. The global snapshot indexer is able to maintain a database of which nodes have which sequences of snapshots and, as such and responsive to a restoration request, a process or processes that can access the global snapshot indexer will analyze the locations of sequences of snapshots that are stored on the disaster recovery node as well as the snapshots that are stored on the long-term storage node to identify an unbroken sequence of snapshots that span across the disaster recovery node and the long-term storage node.

The global snapshot indexer is continually updated. Additionally or alternatively, the global snapshot indexer can be implemented through instantiation of several geographically-situated geo-local snapshot indexers. This is shown and described as pertains to FIG. 3B.

Figure 3B:
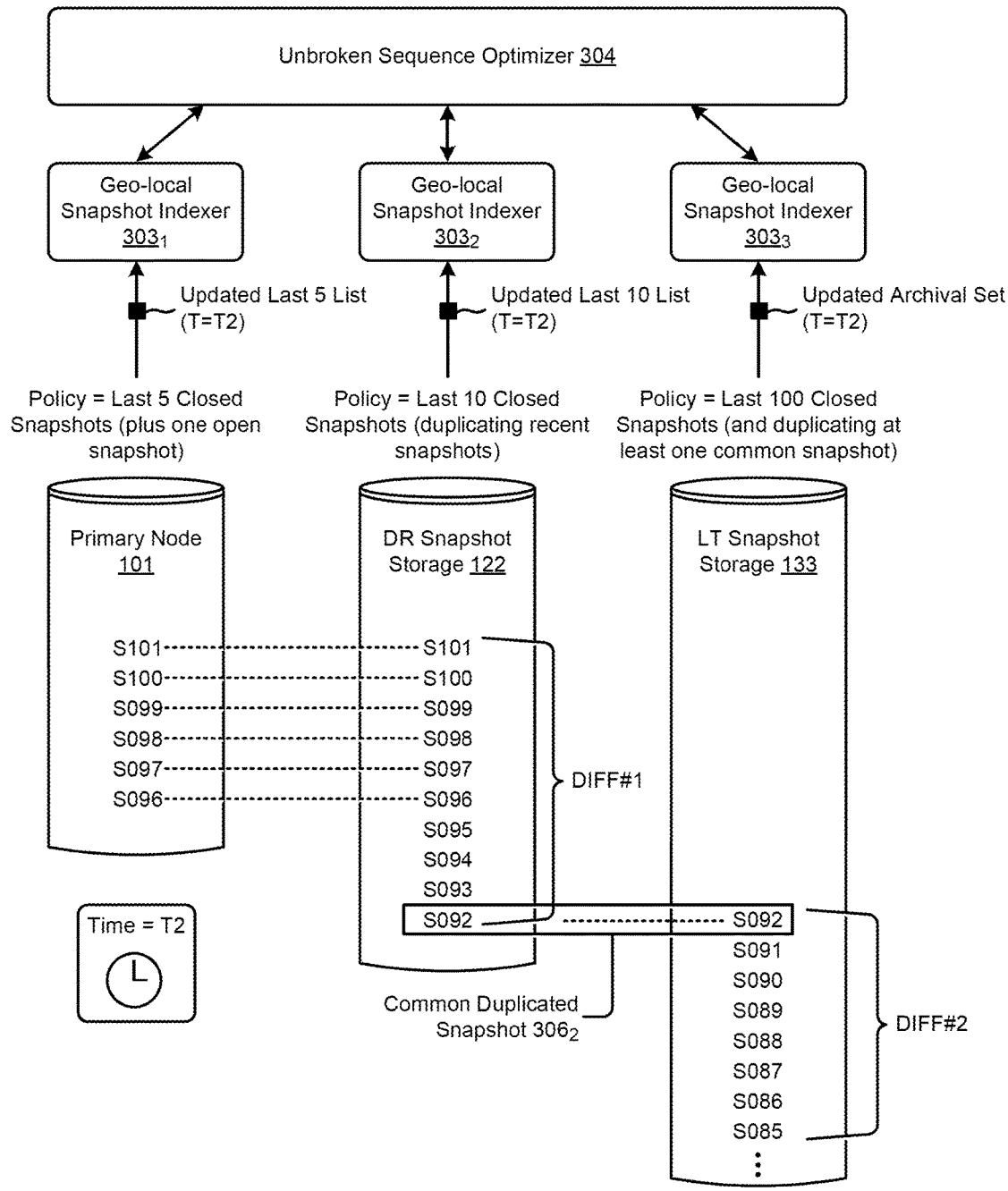
FIG. 3B illustrates a second example snapshot distribution across a multi-tiered storage architecture, according to an embodiment.

FIG. 3B illustrates a second example snapshot distribution 3B00 across a multi-tiered storage architecture. As an option, one or more variations of snapshot distribution 3B00 or any aspect thereof may be implemented in the context of the architecture and functionality of the embodiments described herein and/or in any environment.

This figure illustrates how multiple geographically-situated geo-local snapshot indexers can cooperate with an optimizer facility. The optimizer facility can host a process or processes that access the multiple geographically-situated geo-local snapshot indexers to determine the locations of sequences of snapshots that are stored on the geographically-distributed nodes.

Specifically, and as shown, geo-local snapshot indexer $303_1$, geo-local snapshot indexer $303_2$, and geo-local snapshot indexer $303_3$ interoperates with unbroken sequence optimizer 304 that serves as a freestanding optimizer facility. The unbroken sequence optimizer can host a process or processes that access the multiple geographically-situated geo-local snapshot indexers to determine the locations of sequences of snapshots that are stored on the geographically-distributed nodes. Moreover, the unbroken sequence optimizer can assess the number and sizes of the DIFFs that would need to be generated in order to produce sufficiently configured DIFFs that can be combined to form restore data. In this example, unbroken sequence optimizer determines that DIFF#2 is to be generated from unbroken sequence [S092-S085] and that DIFF#1 is be generated from unbroken sequence[S101-S092] using overlapping common duplicated snapshot $306_2$. Those two DIFFs can be combined to form restore data, which in turn is used to restore an entity at the primary node.

The various nodes of the multi-level architecture periodically report their then-current sequence of snapshots to a indexer (e.g., global snapshot indexer, geo-local snapshot indexer). An updated sequence of snapshots may differ from any previous sequence of snapshots that were reported at a previous time. More specifically, at T=T2 the primary node reports an updated last 5 list, this time including snapshot S101 down to S096; the disaster recovery node reports an updated last 10 list, this time from S101 down to S092; and the long-term storage node reports an updated archival set, this time from S092 down to S085 and earlier.

Figure 4:
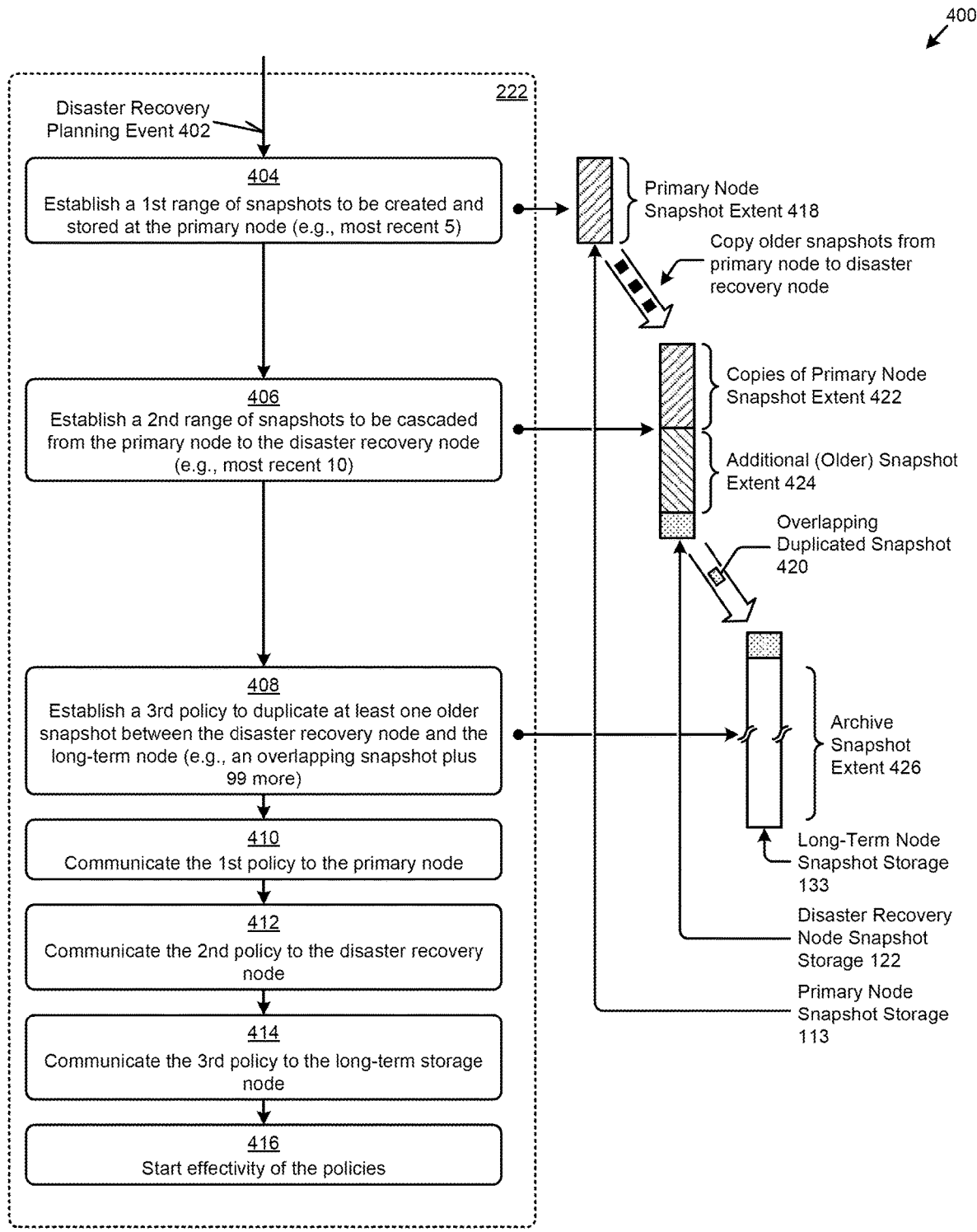
FIG. 4 depicts an example operation flow for establishing tier-specific snapshot distribution policies in a multi-tiered storage architecture, according to an embodiment.

FIG. 4 depicts an example operation flow 400 for establishing tier-specific snapshot distribution policies in a multi-tiered storage architecture. As an option, one or more variations of operation flow 400 or any aspect thereof may be implemented in the context of the architecture and functionality of the embodiments described herein and/or in any environment.

FIG. 4 presents one possible implementation of step 222. Specifically, FIG. 4 presents an operation flow that serves to initially establish policies corresponding to nodes and/or tiers of the multi-tiered storage architecture. As shown, the operation flow commences upon receipt of a disaster recovery planning event 402. Such a disaster recovery planning event might be raised from a user interface that is operated by a cluster administrator. Alternatively, such a disaster recovery planning event might be raised from an operational element of a public or private cloud. In the three-tier scenario involving a primary node in a first tier, a disaster recovery node in a second tier, and a long-term storage in a third tier, step 404, step 406 and step 408 serve to coordinate tier-specific policies that, when enforced in aggregate, serve to implement a disaster recovery scheme that optimizes computing resources for calculating and communicating DIFF data by and between different nodes of the multiple tiers.

In this example, a first policy to be communicated to a primary node (via step 410) specifies a first extent of snapshots to be created and stored (e.g., primary node snapshot extent 418). A second policy to be communicated (via step 412) to a first backup node (e.g., a disaster recovery node) specifies a second extent of snapshots to be received and maintained as copies (e.g., copies of the primary node snapshot extent 422), as well as an additional snapshot extent 424. A third policy to be communicated (via step 414) to a second backup node (e.g., a long term storage node) specifies the extent of overlapping snapshots, copies of which overlapping snapshots are stored at both the disaster recovery node and the long-term storage node. Additionally the third policy may specify an archive snapshot extent 426.

As can be seen from the foregoing example, when establishing the foregoing policies, and more particularly, when establishing the relationship of the foregoing policies, the policy for the first backup node specifies a first range of snapshots to be managed at the first backup node that overlaps a second range of snapshots to be managed by the second backup node. The overlap can specify just one overlapping snapshot or the overlap can specify multiple overlapping snapshots.

When the policies have been communicated to their corresponding nodes, the effectivity of the polices as an aggregate can begin (step 416). The various nodes in the various tiers can operate continuously, while enforcing correspondence to their respective policies. Snapshots are copied as specified in the policies (e.g., the most recent 5 from the primary node to the disaster recovery node), and snapshots are cascaded from the first tier to the second tier, and from the second tier to the third tier. Since there is always at least one snapshot at a disaster recovery node that is a common, duplicated snapshot with the same snapshot at a long-term storage node (e.g., overlapping duplicated snapshot 420), a gap that would otherwise occur can be covered.

The various nodes in the various tiers operate continuously and accordingly, any node in any tier is continually in a position to respond to a data state restore request. One possible technique for responding to a data state restore request is shown and described as pertains to FIG. 5.

Figure 5:
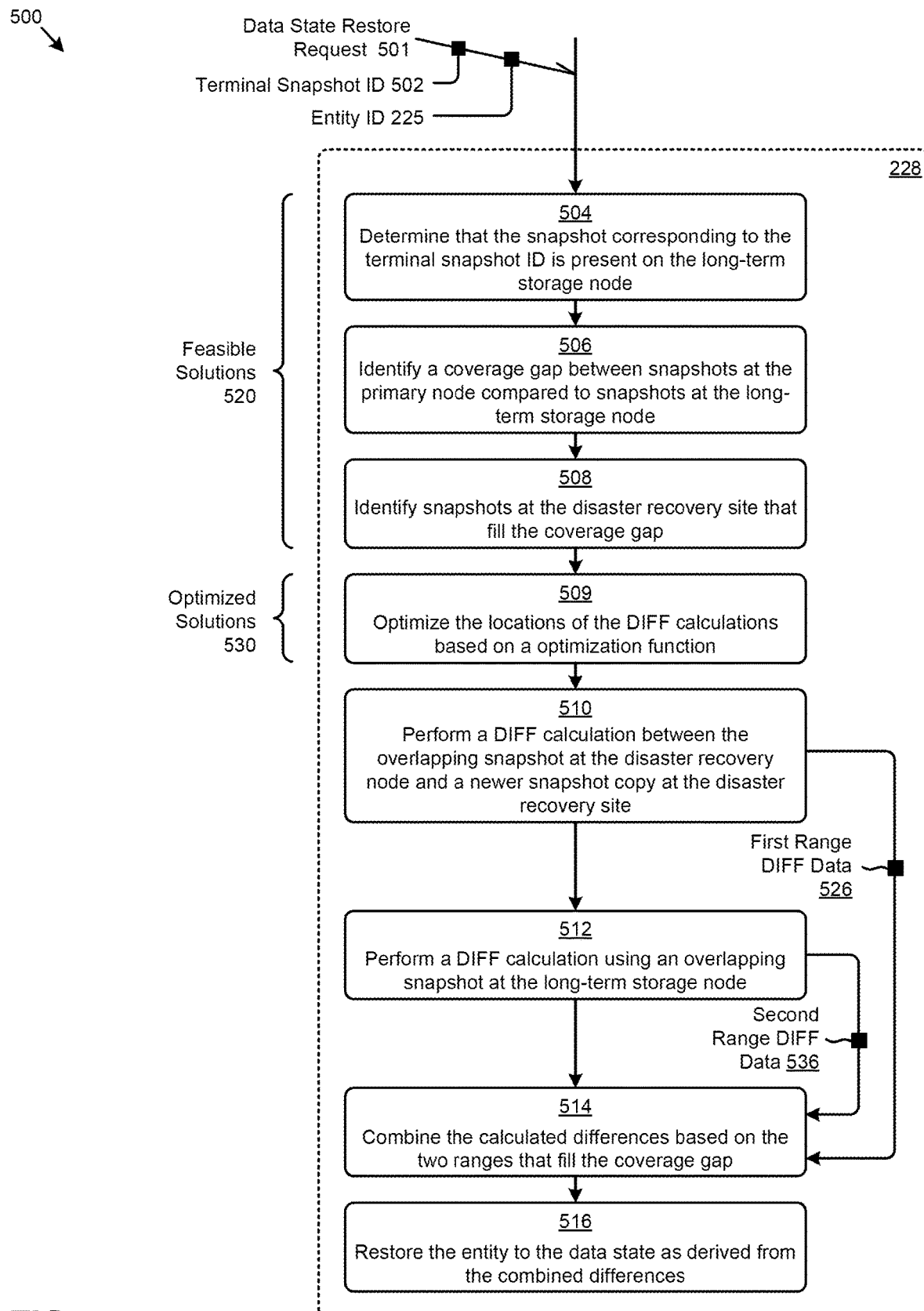
FIG. 5 depicts an example operation flow for restoring a virtual machine data state from snapshot differences that are calculated by different nodes of a multi-tiered storage architecture, according to an embodiment.

FIG. 5 depicts an example operation flow 500 for restoring a virtual machine data state from snapshot differences that are calculated by different nodes of a multi-tiered storage architecture. As an option, one or more variations of operation flow 500 or any aspect thereof may be implemented in the context of the architecture and functionality of the embodiments described herein and/or in any environment.

The operation flow 500 is being presented merely as one possible series of steps to be undertaken when a data state restore request 501 is received. The sequence of steps is carried out such that, at step 516, the particular desired data state as derived from information in the data state restore request is applied to the entity (e.g., the entity identified by the given entity ID 225) to be restored. The oldest-closed snapshot from which a series of later-closed snapshots are to be applied is given in the data state restore request via terminal snapshot ID 502.

At step 504, queries are carried out to determine that the snapshot corresponding to the terminal snapshot ID is present on the long-term storage node. Step 506 serves to identify a coverage gap between snapshots at the primary node as compared to snapshots at the long-term storage node. Assuming there is a coverage gap between snapshots at the primary node as compared to snapshots at the long-term storage node, step 508 serves to identify snapshots at the disaster recovery site that fill the coverage gap. There may be many possibilities to fill the coverage gap. Accordingly, accomplishment of step 504, step 506 and step 508 result in determination of feasible solutions 520. Analysis of the feasible solutions is carried out in step 509, where any/all of a plurality of feasible solutions are evaluated against an optimization function using then-current conditions. The optimizer considers one or more of, the data size corresponding to results of a DIFF calculation, network bandwidth between nodes, CPU availability at any node of the multi-tiered architecture, CPU availability at one or more nodes other than the nodes of the multi-tiered architecture, etc. In example implementations, the optimizer considers the sizes of given difference set data as compared to the available network bandwidth between the primary node and the first backup node, or as compared to the available network bandwidth between the primary node and the second backup node.

Strictly as one implementation, the optimizer can be realized as a module within a dedicated computational element (e.g., the unbroken sequence optimizer 304 of FIG. 3B). There may be multiple feasible solutions that are also deemed to be optimized solutions 530 (i.e., based on the values returned by the optimization function). In such cases, the optimizer will select one of the optimized solutions.

Any/all of the feasible solutions and any/all of the optimized solutions include at least one overlapping snapshot between the long-term storage node and the disaster recover node. Accordingly, step 510 is able to perform a DIFF calculation using the overlapping snapshot at the disaster recovery node and a newer snapshot copy at the disaster recovery site. Completion of this DIFF calculation results in first range DIFF data 526. Concurrently or sequentially, step 512 is able to perform a DIFF calculation using the same overlapping snapshot. Completion of the DIFF calculation results in second range DIFF data 536.

The results of the two DIFFs (e.g., first range DIFF data 126 and second range DIFF data 136) are combined (step 514). As such, the desired data state has been derived from an unbroken chain of snapshots. The desired data state can be loaded into the entity (step 516), thus completing restoration of the desired data state into the entity corresponding to the entity ID.

As used herein, the term "DIFFs" or "a DIFF" refers to a data set that is constructed from a sequence of two or more snapshots. In example implementations, a DIFF is organized into a data structure that corresponds a particular block or particular range of blocks to specific data within that particular block or that particular range of blocks. As used herein, a DIFF is calculated from two or more snapshots of an unbroken snapshot sequence. Additionally or alternatively, a combined DIFF can be calculated from two or more source DIFFs, where each of the two or more source DIFFs are each derived from an unbroken snapshot sequence.

Further details regarding general approaches to making and using snapshots are described in U.S. Patent Publication No. 2019-0347029 titled "LOSSLESS DATA RESTORE USING MULTIPLE LEVELS OF LIGHTWEIGHT SNAPSHOTS", filed on Nov. 26, 2018, which is hereby incorporated by reference in its entirety.

Figure 6A:
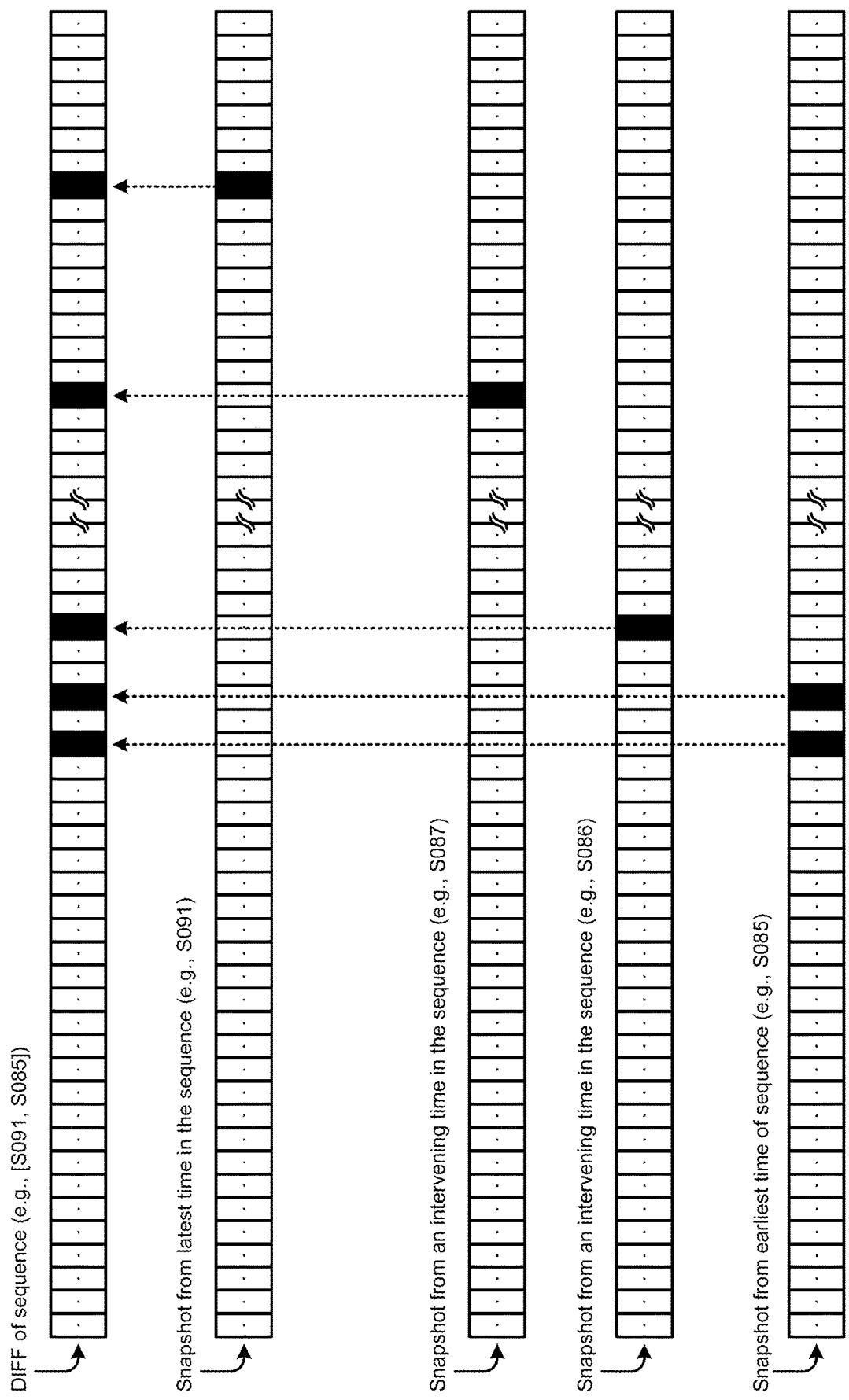
FIG. 6A, FIG. 6B, and FIG. 6C present difference calculation diagrams showing a snapshot difference combining technique for use in systems that compute over an unbroken snapshot sequence for disaster recovery in a multi-tiered storage architecture, according to an embodiment.
Figure 6B:
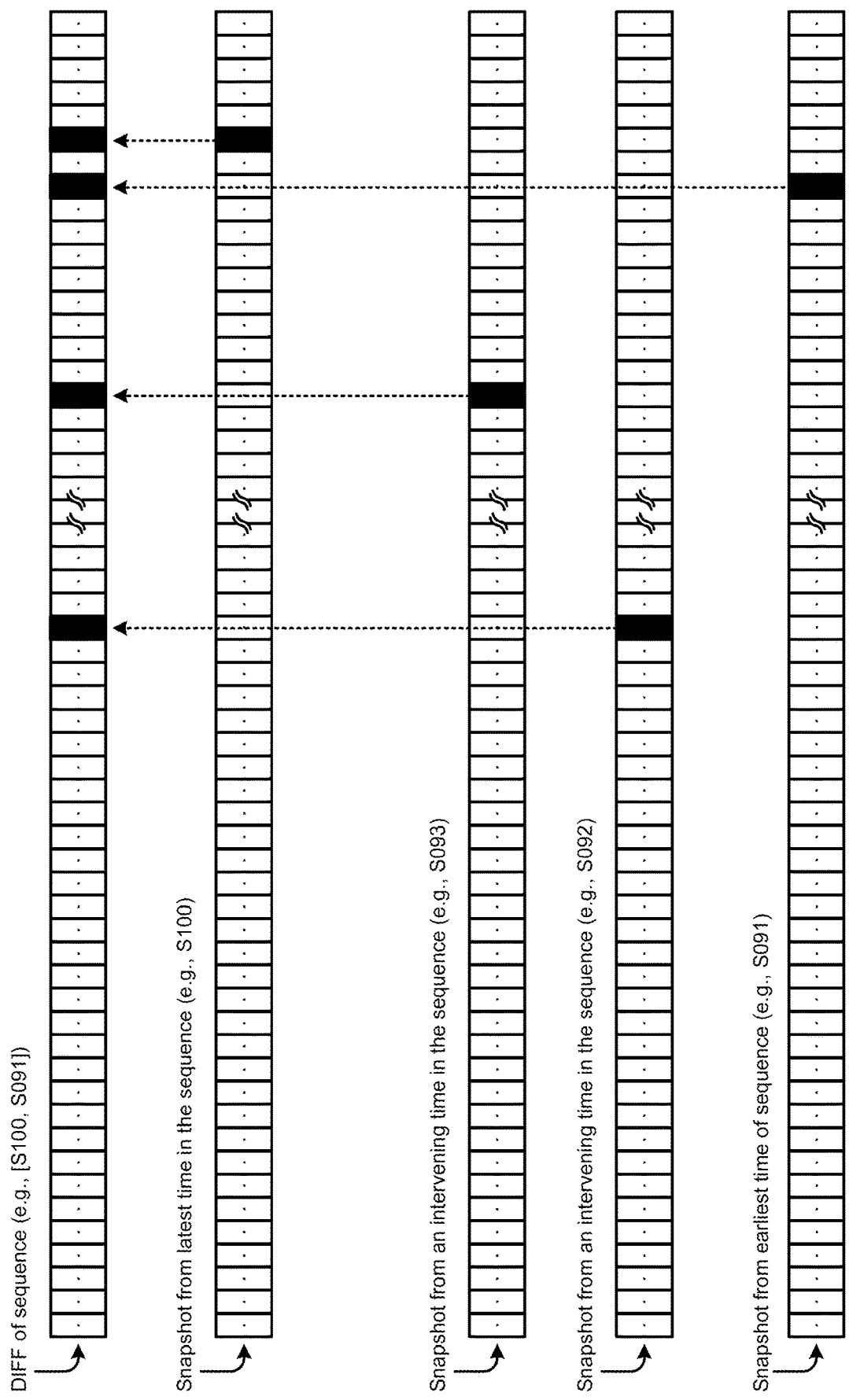
Figure 6C:
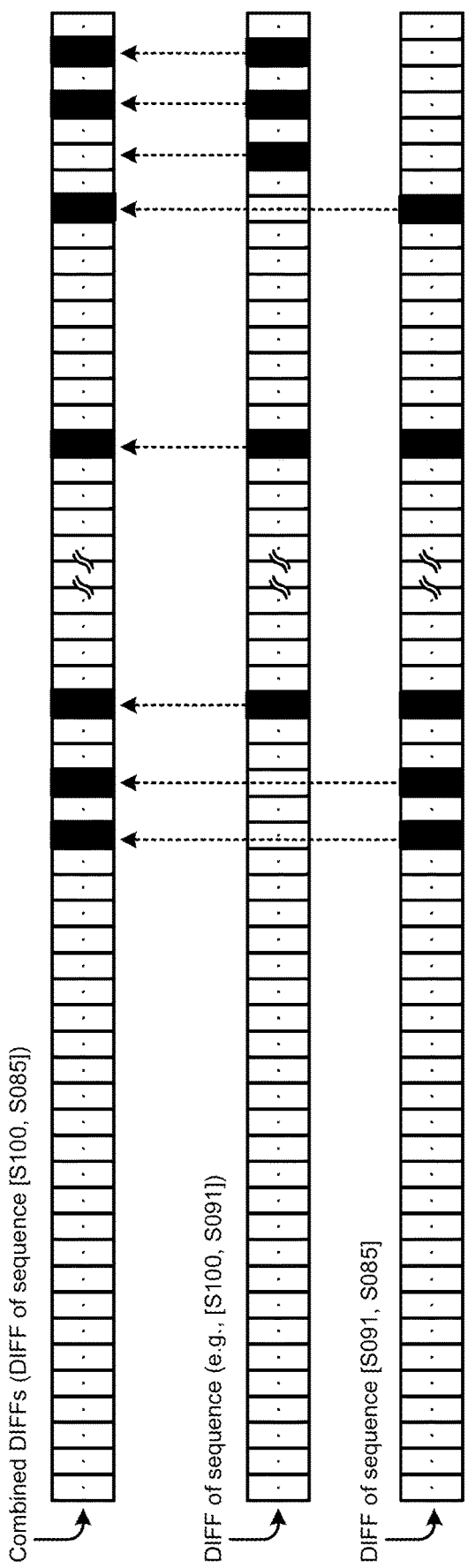

FIG. 6A through FIG. 6C present difference calculation diagrams showing a snapshot difference combining technique for use in systems that compute over an unbroken snapshot sequence for disaster recovery in a multi-tiered storage architecture. As an option, one or more variations of difference calculation diagrams or any aspect thereof may be implemented in the context of the architecture and functionality of the embodiments described herein and/or in any environment.

FIG. 6A shows how a single DIFF can be constructed from a sequence of snapshots. The rectangles represent blocks or spans of storage, and the darkened rectangles represent changed data. As can be seen, the DIFF at the top of the figure includes all of the changes that were made to any block or span of storage at any time between the closure of the oldest/earliest snapshot of the sequence until the latest/newest snapshot of the sequence. In this example, the sequence corresponds to the range of snapshots from S085 to S091, and the result is DIFF[S091, S085] as shown at the top of FIG. 6A. FIG. 6B shows the sequence corresponding to the range of snapshots from S085 to S091. The result of the DIFF calculation (e.g., DIFF[S100, S091]) is shown at the top of FIG. 6B. The heretofore discussed policies, as well as the content of the snapshots influences the sizes of the DIFFs that would need to be generated for combining to form restore data. Moreover, the geographic distribution of the nodes influences the number of DIFFs that would need to be generated for combining to form restore data. In some cases, many (e.g., more than two) DIFFs are calculated for combining to form restore data. In other cases, such as is shown in FIG. 6C, only two DIFFs need to be calculated for combining to form restore data.

FIG. 6C shows how to combine the two DIFFs into a DIFF corresponding to the concatenated, unbroken sequence. Specifically, DIFF[S091, S085] and DIFF[S100, S091] are combined to form DIFF[S100, S085].

Additional Embodiments of the Disclosure

Instruction Code Examples

Figure 7:
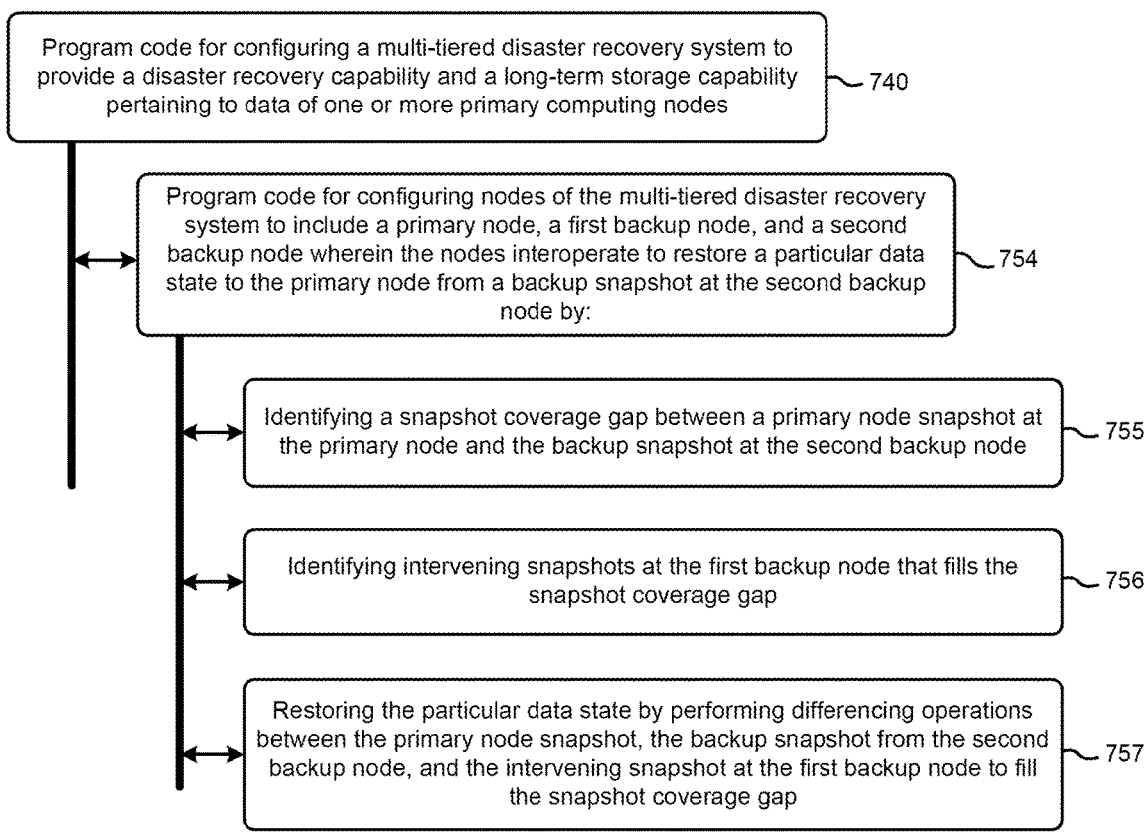
FIG. 7 depicts a system as an arrangement of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually or as combined, serve to form improved technological processes that address restoring a desired data state from snapshots distributed across nodes in a multi-tiered disaster recovery architecture. The partitioning of system 700 is merely illustrative and other partitions are possible.

Variations of the foregoing may include more or fewer of the shown modules. Certain variations may perform more or fewer (or different) steps and/or certain variations may use data elements in more, or in fewer, or in different operations. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected via communication paths, and any operation can communicate with any other operations. The modules of the system can, individually or in combination, perform the operations of system 700. Any operations performed within system 700 may be performed in any order unless as may be specified in the claims. The shown embodiment implements a portion of a computer system, presented as system 700, comprising one or more computer processors to execute a set of program code instructions for accessing memory to hold program code instructions to configure a multi-tiered disaster recovery system (module 740). The system implements a computing configuration comprising a primary node, a first backup node, and a second backup node. The system performs acts (module 754) for restoring a particular data state to the primary node from a backup snapshot at the second backup node. Specifically, step 755 serves to identify a snapshot coverage gap between a primary node snapshot at the primary node and the backup snapshot at the second backup node, and step 756 serves to identify intervening snapshots at the first backup node that fills the snapshot coverage gap. In step 757 the particular data state is restored by performing differencing operations between the primary node snapshot, the backup snapshot from the second backup node, and the intervening snapshots at the first backup node to fill the snapshot coverage gap.

Still further, some embodiments include variations in the operations performed, and some embodiments include variations of aspects of the data elements used in the operations.

System Architecture Overview

Additional System Architecture Examples

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 8A, FIG. 8B, FIG. 8C, and FIG. 8D.

Figure 8A:
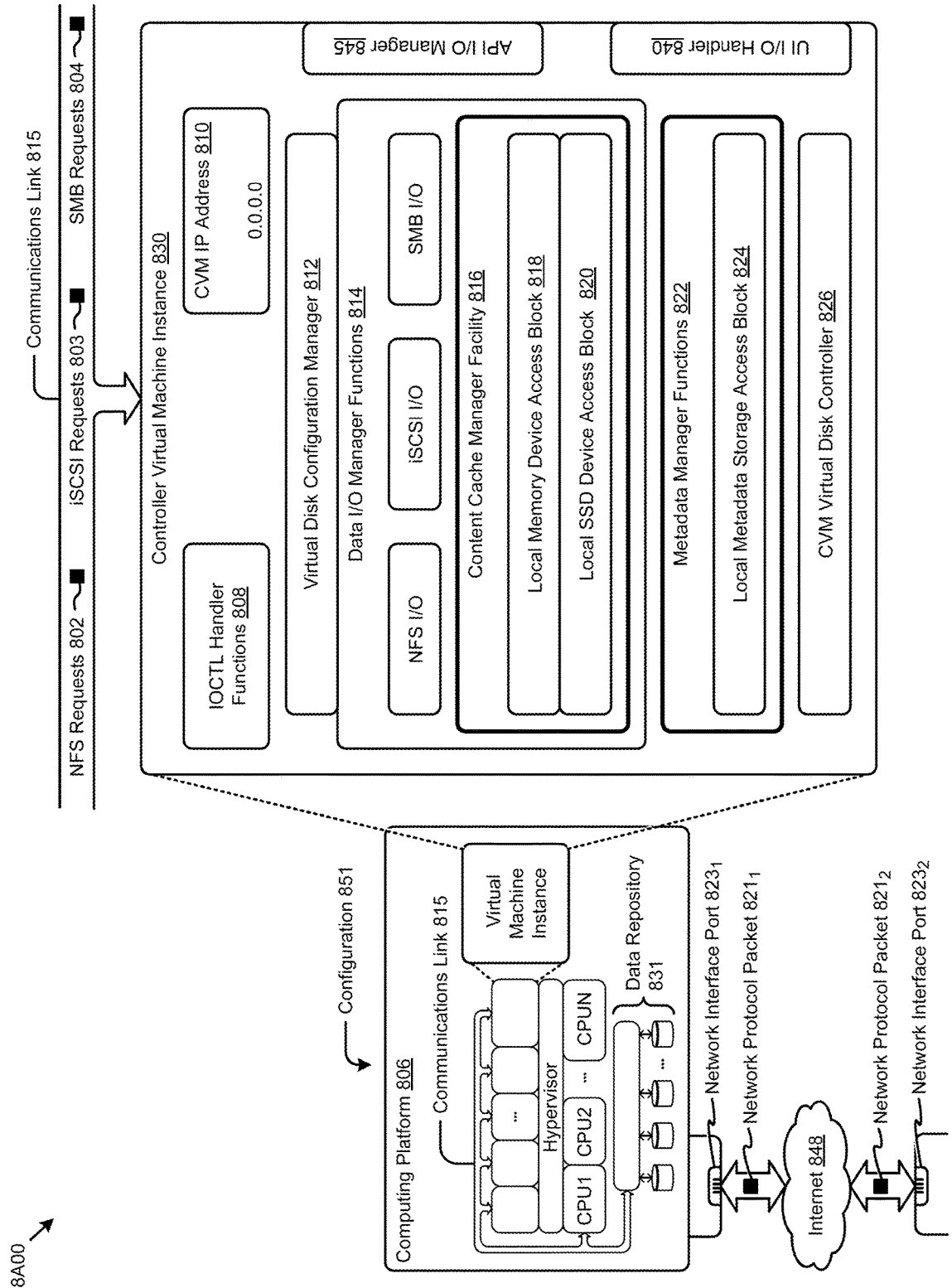
FIG. 8A, FIG. 8B, FIG. 8C, and FIG. 8D depict virtualization system architectures comprising collections of interconnected components suitable for implementing embodiments of the present disclosure and/or for use in the herein-described environments.

FIG. 8A depicts a virtualized controller as implemented in the shown virtual machine architecture 8A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to maintaining an unbroken snapshot sequence for disaster recovery in a multi-tiered storage architecture. In some embodiments, a module may include one or more state machines and/or combinational logic used to implement or facilitate the operational and/or performance characteristics pertaining to maintaining an unbroken snapshot sequence for disaster recovery in a multi-tiered storage architecture.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of maintaining an unbroken snapshot sequence for disaster recovery in a multi-tiered storage architecture). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to maintaining an unbroken snapshot sequence for disaster recovery in a multi-tiered storage architecture, and/or for improving the way data is manipulated when performing computerized operations pertaining to identifying an unbroken sequence of snapshots that span across two or more nodes that are organized into a multi-tiered disaster recovery architecture.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 8B:
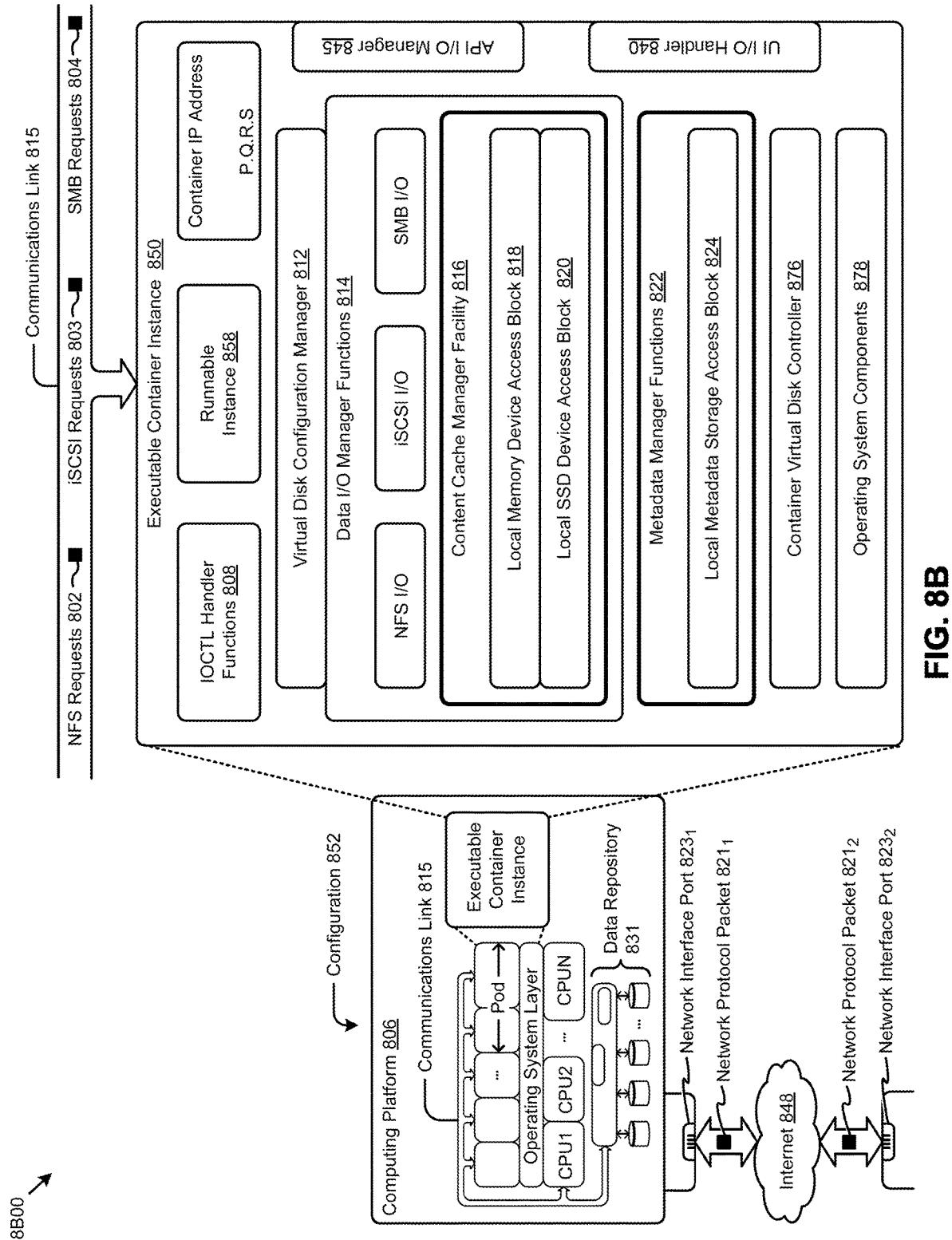

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
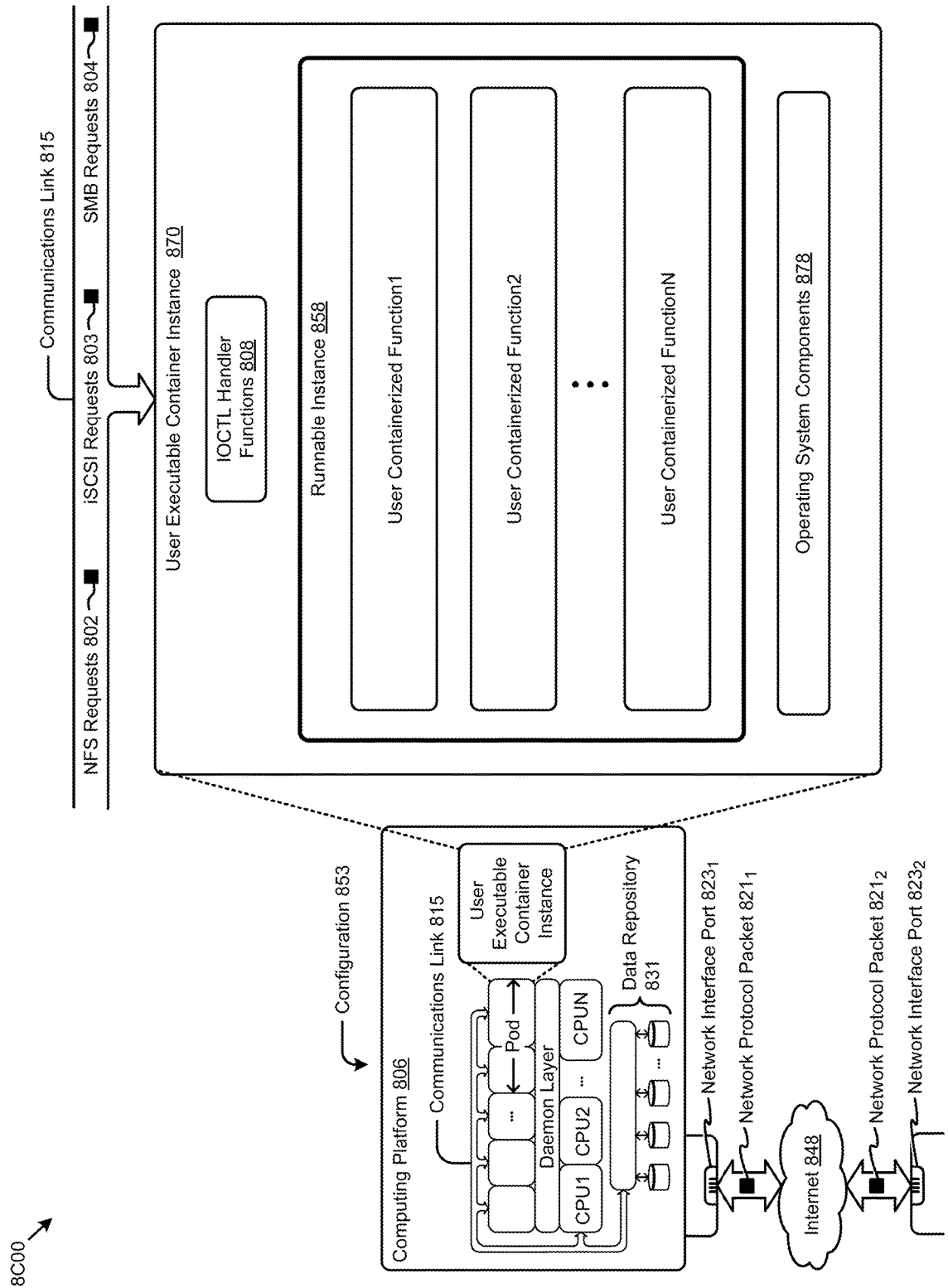

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 870.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8D:
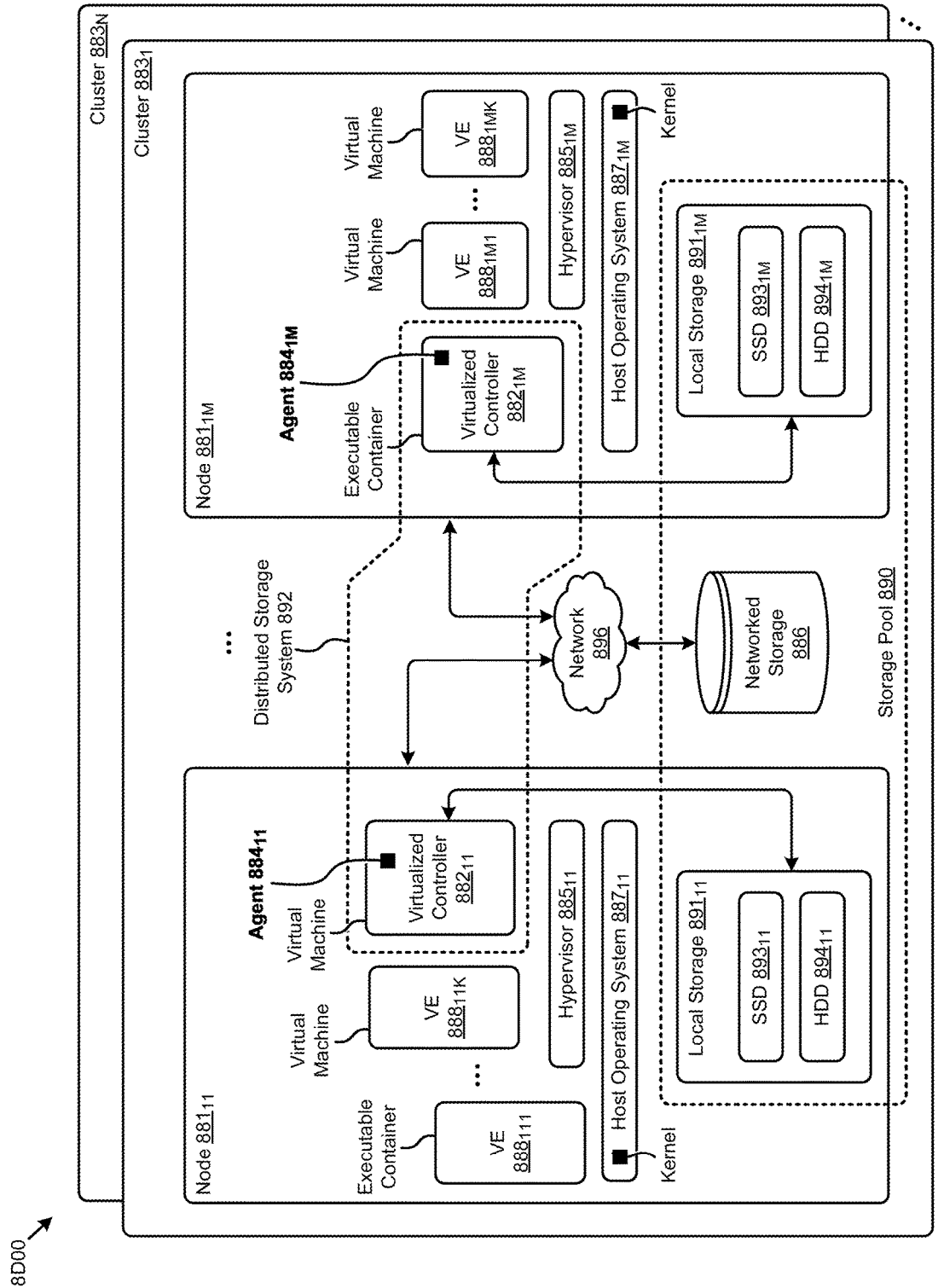

FIG. 8D depicts a distributed virtualization system in a multi-cluster environment 8D00. The shown distributed virtualization system is configured to be used to implement the herein disclosed techniques. Specifically, the distributed virtualization system of FIG. 8D comprises multiple clusters (e.g., cluster $883_1$, . . . , cluster $883_N$) comprising multiple nodes that have multiple tiers of storage in a storage pool. Representative nodes (e.g., node $881_{11}$, . . . , node $881_{1M}$) and storage pool 890 associated with cluster $883_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}$, . . . , local storage $891_{1M}$). For example, the local storage can be within or directly attached to a server and/or appliance associated with the nodes. Such local storage can include solid state drives (SSD $893_{11}$, . . . , SSD $893_{1M}$), hard disk drives (HDD $894_{11}$, . . . , HDD $894_{1M}$), and/or other storage devices.

As shown, any of the nodes of the distributed virtualization system can implement one or more user virtualized entities (e.g., VE $888_{111}$, . . . , VE $888_{11K}$, . . . , VE $888_{1M1}$, . . . , VE $888_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $887_{11}$, . . . , host operating system $887_{1M}$), while the VMs run multiple applications on various respective guest operating systems. Such flexibility can be facilitated at least in part by a hypervisor (e.g., hypervisor $885_{11}$, . . . , hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $887_{11}$, . . . , host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In certain embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to identifying an unbroken sequence of snapshots that span across two or more nodes that are organized into a multi-tiered disaster recovery architecture can be brought to bear through implementation of any one or more of the foregoing techniques. Moreover, any aspect or aspects of restoring a desired data state from snapshots distributed across nodes in a multi-tiered disaster recovery architecture can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for restoring data, the acts comprising:
   receiving an instruction to restore a particular data state to a primary node from a backup snapshot at a backup node by:
      identifying a snapshot coverage gap between a primary node snapshot at the primary node and the backup snapshot at the backup node;
      identifying an intervening snapshot at another backup node that fills the snapshot coverage gap; and
      restoring the particular data state by performing a differencing operation between the primary node snapshot, the backup snapshot at the backup node, and the intervening snapshot at the another backup node, wherein the differencing operation identifies a difference between multiple ranges of snapshots at a combination of at least two of the primary node, the backup node, or the another backup node.

2. The non-transitory computer readable medium of claim 1, further comprising instructions which, when stored in memory and executed by the processor cause the processor to perform further acts of establishing a first policy for the primary node, a second policy for the backup node, and a third policy for the another backup node.

3. The non-transitory computer readable medium of claim 2, wherein the second policy for the backup node specifies a range of snapshots that overlaps another range of snapshots at the another backup node by at least one snapshot.

4. The non-transitory computer readable medium of claim 1, further comprising instructions which, when stored in memory and executed by the processor cause the processor to perform further acts of an indexer configured to receive an update from one or more of, the primary node, the backup node, or the another backup node, wherein the update comprises an indication of locally managed snapshots.

5. The non-transitory computer readable medium of claim 1, further comprising instructions which, when stored in memory and executed by the processor cause the processor to perform further acts of an optimizer that considers at least, available network bandwidth between the primary node and the backup node, available network bandwidth between the backup node and the another backup node, and available network bandwidth between the primary node and the another backup node.

6. The non-transitory computer readable medium of claim 5, wherein the optimizer further considers geographic distribution of one or more of, the primary node, the backup node, or the another backup node.

7. The non-transitory computer readable medium of claim 5, wherein the optimizer further considers a size of a given difference set data as compared to the available network bandwidth between the primary node and the backup node.

8. The non-transitory computer readable medium of claim 1, wherein the particular data state corresponds to at least one of, a virtual disk, a virtual machine, or node configuration data.

9. A method for restoring data, the method comprising:
receiving an instruction to restore a particular data state to a primary node from a backup snapshot at a backup node by:
identifying a snapshot coverage gap between a primary node snapshot at the primary node and the backup snapshot at the backup node;
identifying an intervening snapshot at another backup node that fills the snapshot coverage gap; and
restoring the particular data state by performing a differencing operation between the primary node snapshot, the backup snapshot at the backup node, and the intervening snapshot at the another backup node, wherein the differencing operation identifies a difference between multiple ranges of snapshots at a combination of at least two of the primary node, the backup node, or the another backup node.

10. The method of claim 9, further comprising establishing a first policy for the primary node, a second policy for the backup node, and a third policy for the another backup node.

11. The method of claim 10, wherein the second policy for the backup node specifies a range of snapshots that overlaps another range of snapshots at the another backup node by at least one snapshot.

12. The method of claim 9, further comprising an indexer configured to receive an update from one or more of, the primary node, the backup node, or the another backup node, wherein the update comprises an indication of locally managed snapshots.

13. The method of claim 9, further comprising an optimizer that considers at least, available network bandwidth between the primary node and the backup node, available network bandwidth between the backup node and the another backup node, and available network bandwidth between the primary node and the another backup node.

14. The method of claim 13, wherein the optimizer further considers geographic distribution of one or more of, the primary node, the backup node, or the another backup node.

15. The method of claim 13, wherein the optimizer further considers a size of a given difference set data as compared to the available network bandwidth between the primary node and the backup node.

16. The method of claim 9, wherein the particular data state corresponds to at least one of, a virtual disk, a virtual machine, or node configuration data.

17. A system for restoring data, the system comprising:
a storage medium having stored thereon a sequence of instructions; and
a processor that executes the sequence of instructions to cause the processor to perform acts comprising,
receiving an instruction to restore a particular data state to a primary node from a backup snapshot at a backup node by:
identifying a snapshot coverage gap between a primary node snapshot at the primary node and the backup snapshot at the backup node;
identifying an intervening snapshot at another backup node that fills the snapshot coverage gap; and
restoring the particular data state by performing a differencing operation between the primary node snapshot, the backup snapshot at the backup node, and the intervening snapshot at the another backup node, wherein the differencing operation identifies a difference between multiple ranges of snapshots at a combination of at least two of the primary node, the backup node, or the another backup node.

18. The system of claim 17, further comprising instructions which, when stored in memory and executed by the processor cause the processor to perform further acts of establishing a first policy for the primary node, a second policy for the backup node, and a third policy for the another backup node.

19. The system of claim 18, wherein the second policy for the backup node specifies a range of snapshots that overlaps another range of snapshots at the another backup node by at least one snapshot.

20. The system of claim 17, further comprising instructions which, when stored in memory and executed by the processor cause the processor to perform further acts of an indexer configured to receive an update from one or more of, the primary node, the backup node, or the another backup node, wherein the update comprises an indication of locally managed snapshots.

21. The system of claim 17, further comprising instructions which, when stored in memory and executed by the processor cause the processor to perform further acts of an optimizer that considers at least, available network bandwidth between the primary node and the backup node, available network bandwidth between the backup node and the another backup node, and available network bandwidth between the primary node and the another backup node.

22. The system of claim 21, wherein the optimizer further considers geographic distribution of one or more of, the primary node, the backup node, or the another backup node.

23. The system of claim 21, wherein the optimizer further considers a size of a given difference set data as compared to the available network bandwidth between the primary node and the backup node.

24. The system of claim 17, wherein the particular data state corresponds to at least one of, a virtual disk, a virtual machine, or node configuration data.

* * * * *